United States Patent Office 3,312,692
Patented Apr. 4, 1967

3,312,692
16-ALKYLENE PROGESTERONES AND INTERMEDIATES FORMED IN THE PRODUCTION THEREOF
Eugene P. Oliveto, Glen Ridge, Richard Rausser, Union, and Emanuel Hershberg, West Orange, N.J., assignors to Schering Corporation, Bloomfield, N.J., a corporation of New Jersey
No Drawing. Filed Dec. 22, 1959, Ser. No. 861,208
19 Claims. (Cl. 260—239.5)

This invention relates to a new and useful group of exocyclic unsaturated pregnanes and to methods for their manufacture. More particularly, this invention relates to 16-alkylideneprogesterones which are therapeutically active per se and are also valuable as intermediates, and to pharmaceutical compositions containing such compounds.

Contemplated as being within the scope of this invention are 6, 17, or 21-monosubstituted, (6,17), (6,21), (17,21)-disubstituted, 6,17,21-trisubstituted-16-alkylideneprogesterones, their 9,11-dihalogeno and 11-oxygenated derivatives as well as the 19-nor, 1-dehydro, 6-dehydro and 1,6-bis-dehydro analogs of the aforementioned 16-alkylideneprogesterone derivatives.

Our novel progesterones are represented by the following formula, and include the 19-nor, 1-dehydro, 6-dehydro and 1,6-bis-dehydro analogs thereof:

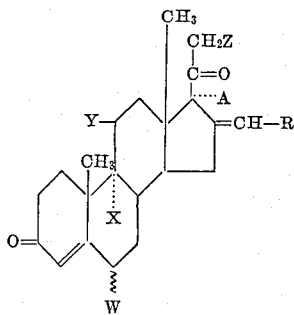

wherein W is a member of the group consisting of hydrogen, methyl, and halogen, preferably chlorine and fluorine; X is a member of the group consisting of hydrogen and halogen; Y is a member of the group consisting of hydrogen, hydroxy, keto, acyloxy and halogen, and when Y is hydrogen, X is hydrogen; A is a member of the group consisting of hydrogen, hydroxy and acyloxy; and R is a member of the group consisting of hydrogen and an alkyl radical having preferably up to four carbon atoms; and Z is a member of the group consisting of hydrogen and halogen, preferably iodine and fluorine.

By the term "acyloxy" is contemplated hydrocarbon carboxylic acid radicals having up to eight carbon atoms, preferably lower alkanoic acids having up to six carbon atoms. These preferred radicals are those obtained from acids such as acetic, propionic, valeric, caproic, t-butylacetic, and the like.

The alkyl radical designated by "R" in the general formula preferably encompasses hydrocarbon radicals such as methyl, ethyl, n-propyl, isopropyl, n-butyl, sec.-butyl, t-butyl although higher homologs such as pentyl and hexyl come within the scope of this invention.

When X and Y are both halogen, there is contemplated halogen pairs such as (Cl,Cl), (Br,Br), (F,F), (Cl,Br), (Cl,F), (F,Cl), (F,Br), (I,Cl), (I,F), (Br,F) and the like.

In this specification, a bond shown as a curved or wavy line ( ) such as is shown at C–6 indicates that both the α and β-configurations are included. A compound name which does not specifically indicate the α or β-configuration implies the inclusion of both isomer forms. Thus, the compound name 6-methyl-16-methyleneprogesterone includes the compounds 6α-methyl-16-methyleneprogesterone and 6β-methyl-16-methyleneprogesterone.

The novel compounds of the general formula as well as the 19-nor, 1-dehydro,6-dehydro and 1,6-bis-dehydro analogs thereof are active progestational agents. They are thus valuable in the treatment of habitual and threatened abortion, functional dysmenorrhea and premenstrual tension.

It has long been known that progesterone (the corresponding 16-unsubstituted analog of our novel 16-methyleneprogesterone) has progestational activity. Progesterone, however, has the disadvantage of being therapeutically valuable only when administered parenterally. Surprisingly, our 16-alkylideneprogesterones are active when administered via both the parenteral and oral route. Moreover, 16-alkylideneprogesterones such as 16-methyleneprogesterone advantageously have a much greater potency than progesterone both when taken orally or parenterally. Thus, to relieve a given symptom, a smaller dose of a 16-alkylideneprogesterone of our invention may be employed than would be required if progesterone were being administered.

Our novel compounds are preferably administered orally in the form of tablets which may contain excipients such as starch or sugar, or in the form of suspensions and elixirs. The 16-alkylideneprogesterones may also be injected parenterally such as in the form of suspensions for intramuscular and subcutaneous administration.

Our 16-alkylideneprogesterones in addition to being valuable pharmacologically, can be used as intermediates in the preparation of other therapeutically active steroids. For example, a 21-iodo-16-alkylideneprogesterone of the general formula such as 16-methylene-17α-hydroxy-21-iodoprogesterone on treatment with a salt such as potassium acetate is converted to a novel intermediary 21-acetoxy compound, 16-methylene-17α-hydroxy-4-pregnene-17α,21-diol-3,20-dione 21-acetate. Microbiological hydroxylation of the aforementioned intermediate at C–11 by known techniques with, for example, Curvularia lunata yields the novel, therapeutically active 16-alkylidenepregnane corticoid, 16-methylenehydrocortisone (16-methylene-4-pregnene-11β,17α,21-triol-3,20-dione) which is described in the copending application of Oliveto et al., Ser. No. 861,211, filed simultaneously herewith.

The 16-alkylidene compounds falling under the general formula (except the 17α-hydroxyprogesterones which are valuable mainly as intermediates) all possess the therapeutic activity as described above. However, the preferred embodiment of our invention are those compounds possessing a 17-acyloxy group, and in particular those having hydrogen or an oxygenated function at the 11-carbon. The preferred class include compounds such as 16-methylene - 17α - acetoxyprogesterone (16-methylene-17α-hydroxyprogesterone 17-acetate), 6α-methyl-16-methylene-17α-acetoxyprogesterone, 6α - fluoro-16-methylene-17α-caprooxyprogesterone (6α - fluoro-16-methylene-17α-hydroxyprogesterone 17-caproate), 6α-methyl-9α-bromo-11β,17α-dihydroxy-16-methyleneprogesterone 17-acetate, 6α - methyl-9α-fluoro-11-keto-16-methylene-17α - acetoxyprogesterone, 9α-chloro - 11β,17α - dihydroxy-16-methyleneprogesterone 11-formate 17-acetate, and 16-methylene-7α-acetoxy-21 - fluoro-progesterone. Some 9-11-dihalogeno compounds of the preferred 17α-acetoxy-16-alkylideneprogesterones are 9α,11β-dichloro-16-methylene-17α-acetoxyprogesterone, 6α-methyl-9α-bromo-11β-fluoro-16-methylene-17α-acetoxyprogesterone, 6α,9α,11β-trichloro-16-methylene-17α-acetoxyprogesterone, 6α,21-difluoro-9α, 11β-dichloro-16-methylene-17α-acetoxyprogesterone, and 9α,11β-difluoro-16-methylene-17α-acetoxyprogesterone.

The 16-alkylidene-17α-hydroxyprogesterones of the general formula, their 1-dehydro, 6-dehydro, 1,6-bisdehydro and 19-nor analogs are valuable as intermediates in the preparation of the corresponding 17α-acyloxy analogs, which are active progestins. In addition, the 9α,11β-dihalogeno-21-fluoro-16-alkylidene-17α-hydroxyprogesterones of our invention and in particular the 1-dehydro analogs possess anti-inflammatory activity, thus rendering the compounds therapeutically active per se.

The novel compounds of the general formula may be prepared by a number of different routes, the choice of which is dependent on the final product being produced.

By our novel process, the preferred compounds of our invention, i.e., the 16-alkylidene-17α-acyloxyprogesterones are prepared from the corresponding 16-alkyl-16,17-oxidoprogesterones in a one-step procedure wherein the 16-alkylidene and the 17α-acyloxy groups are simultaneously introduced into the molecule. Thus, our process is advantageously used over other procedures for preparing 16-alkylidene-17α-acyloxyprogesterones from 16-alkyl-16,17-oxidoprogesterones which involve more than one step. According to our process, a 16-alkyl-16,17-oxido-4-pregnene-3-one is treated with a mixture of an acid and an acid anhydride whereby there is formed a 16-methylene-17α-acyloxyprogesterone. When the anhydride in the acid-acid anhydride mixture is derived from an acid other than the free acid used in the reagent mixture, the acyl radical of the weaker acid (i.e. the acid possessing the larger $pK_A$ constant) will enter the steroid molecule. Typically, acid-acid anhydride mixtures which are used in our process are exemplified by a lower alkanoic acid and the corresponding acid anhydride, for example, acetic acid and acetic anhydride, an alkanoic acid anhydride such as acetic or caproic anhyride in the presence of a catalytic amount of a strong organic acid (i.e. an acid having a smaller $pK_A$ than that of the acid from which the aforementioned anhydrides are derived) exemplified by p-toluenesulfonic acid, perchloric or trifluoroacetic acid or, alternatively and preferably, a lower alkanoic acid such as acetic or caproic in the presence of a strong organic acid anhydride (trifluoroacetic anhydride for example). Thus by our process, if a 16-alkylidene-17α-acetate derivative is desired there may be used acid-acid anhydride mixtures such as acetic acid and acetic anhydride, acetic anhydride and either p-toluenesulfonic acid or trifluoroacetic acid, or preferably acetic acid and trifluoroacetic anhydride. Specifically, 16β-methyl-16α,17α-oxido-4-pregnene-3,20-dione upon reaction with acetic acid in the presence of trifluoroacetic acid anhydride according to the preferred embodiment of our process is converted to the novel, therapeutically active 16-methylene-17α-acetoxy-progesterone. If caproic acid instead of acetic acid is used with trifluoroacetic anhydride, the aforementioned oxido-4-pregnene is converted to 16-methylene-17α-caprooxyprogesterone.

Our process whereby a 16-alkyl-16,17-oxidoprogesterone is converted to the corresponding 16-alkylidene-17α-alkanoyloxyprogesterone is generally carried out in a solvent under anhydrous conditions and in an inert atmosphere such as argon or nitrogen. Although any inert solvent such as benzene, toluene, xylene and the like may be used, the preferred solvent for our process is the lower alkanoic acid corresponding to the ester desired at C-17. Thus, acetic acid is preferably used when a 17-acetate is desired and caproic acid when a 17-caproate is to be prepared.

The preferred procedure for carrying out our process is to heat a tenth of a mole of a 16-alkyl-16,17-oxidoprogesterone for example in a mixture containing approximately 2 to 7 moles of a lower alkanoic acid and approximaely 0.3 to 0.71 mole of trifluoroacetic anhydride, respectively (the lower alkanoic acid serving as solvent as well as reactant) at temperatures ranging from 70 to 100° C. for about 20 minutes to 1.5 hours. In another procedure of choice, a mixture of a tenth of a mole of a 16-alkyl-16,17-oxidoprogesterone is allowed to react with approximately 0.14 to 0.7 mole of a lower alkanoic acid anhydride in the presence of from about 0.02 to 0.06 mole, respectively of p-toluenesulfonic acid in the presence of from about 2 to 6 moles of solvent (preferably a lower alkanoic acid) for approximately 30 minutes to 4 hours at temperatures in the range of 15 to 30° C.

The above represents the preferred mode of carrying out our inventive process and is not to be construed as limiting. However, when a lower alkanoic anhydride is the reagent used in our process, for example, when reacting acetic anhydride and p-toluenesulfonic acid with 16β-methyl-16α,17α-oxidoprogesterone, and the reaction conditions are not within the preferred limits, i.e. if the molar quantities of the reagents are greater, or if a longer reaction time or high temperature is used, there will be formed in addition to the desired 16-alkylidene-17α-acyloxyprogesterone, the enol-3,17-diester form of this compound, e.g. 3β,17α-diacetoxy-16-methylene-3,5-pregnadiene-20-one as well as 16-methylene-17α-acetoxyprogesterone. The greater the deviation from the previously described optimum conditions the greater the amount of enol-diester formed. The 16-alkylideneprogesterones of our invention may be regenerated from the enol-3,17-diester-3,5-pregnadienes thus formed by known techniques utilizing reagents such as methanolic hydrochloric acid or sodium acetate in acetic acid.

Progresterones only have been described as starting compounds in our process. However, any steroid molecule possessing a 16-alkyl-16,17-oxido function, may be converted by our novel process to the corresponding 16-alkylidene-17-acyloxy steroid. Thus, 9α-fluoro-16β-methyl-16α,17α-oxido-4-pregnene-11β,21-diol-3,20-dione 21-acetate (prepared from 9α-fluorohydrocortisone 21-acetate by procedures described in the above-mentioned copending application of Oliveto et al., Ser. No. 861,211) when reacted with acetic acid and trifluoroacetic anhydride according to our novel process will yield 9α-fluoro-16-methyleneprednisolone 11,17,21-triacetate.

Alternatively, our 16-alkylidene-17α-acyloxyprogesterones are prepared from the corresponding 16-alkyl-16,17-oxido-4-pregnene-3,20-dione in a two-step process whereby the oxido group is first converted to the 16-alkylidene-17α-hydroxy function by treatment with a mineral acid such as sulfuric, hydrochloric, or preferably hydrobromic in a lower alkanoic acid such as acetic. Thus, 16β-methyl-16α,17α-oxido-4-pregnene-3,20-dione when treated with acetic acid in the presence of hydrobromic acid yields 16-methylene-17α-hydroxyprogesterone. Esterification of the hydroxyl function at the 17-carbon in 16-methylene-17α-hydroxyprogesterone is then conveniently effected with a lower fatty acid anhydride such as acetic anhydride in the presence of p-toluenesulfonic acid or, preferably, with a lower aliphatic acid such as acetic acid in the presence of trifluoroacetic anhydride to give the corresponding 17-ester, which in this case is 16-methylene-17α-acetoxyprogesterone. By substituting other lower alkanoic acids such as caproic or β-cyclopentylpropionic for acetic in the aforementioned esterification procedures, other 17α-lower alkanoate 16-alkylidene compounds are obtained such as the 17-caproate and the 17α-(β-cyclopentyl)-propionate respectively of 16-methylene-17α-hydroxyprogesterone.

The 16-alkyl-16,17-oxido-5-pregnene-3β-ols, necessary intermediates in our novel process for preparing the 17α-acyloxy-16-alkylideneprogesterones of the general formula, are conveniently prepared from the corresponding 16-alkyl-5,16-pregnadiene-3β-ol-20-ones upon treatment with alkaline hydrogen peroxide. Some of these 5,16-pregnadiene starting compounds are known, for example, 16-methyl-5,16-pregnadiene-3β-ol-20-one. Other 16-alkyl-5,16-pregnadienes may be conveniently prepared from the known 5,16-pregnadiene-3β-ol-20-one 3-acetate by reaction with a suitable alkyl magnesium halide such as, for example, ethyl magnesium iodide in the presence of a copper salt to yield the corresponding 16-alkyl-5-pregnene, e.g., 16α-ethyl-5-pregnene-3β-ol-20-one. Esterification of the 3-hydroxyl is effected by acetic anhydride in pyridine yielding 16α-ethyl-5-pregnene-3β-ol-20-one 3-acetate. Bromination at C-17 (with concomitant addition of bromine at $C_5$ and $C_6$ followed by sodium iodide treatment to regenerate the double bond) by means of bromine in acetic acid followed by dehydrobromination of the thus formed 16α-ethyl-17α-bromo-5-pregnene-3β-ol-20-one 3-acetate with a basic agent such as collidine, dimethylformamide, lutidine or the like yields the requisite 16-alkyl-$\Delta^{5,16}$-intermediate, 16-ethyl-5,16-pregnadiene-3β-ol-20-one 3-acetate.

By a suitable choice of Grignard reagent when preparing the necessary 16-alkyl-16,17-oxido intermediates of our process any desired 16-alkyl compound may be obtained. Thus, reaction of 5,16-pregnadiene-3β-ol-20-one with n-butyl magnesium bromide and subsequent acetylation yields 16α-n-butyl-5-pregnene-3β-ol-20-one 3-acetate. Bromination and dehydrobromination of the 16α-butyl-5-pregnene compounds as described above gives 16-n-butyl-5,16-pregnadiene-3β-ol-20 - one 3 - acetate which, when epoxidized with alkaline hydrogen peroxide yields a necessary intermediate of our process, e.g. 16β-n-butyl-16α,17-oxido-5-pregnene-3β-ol-20 - one. Oxidation of the 3-hydroxy-$\Delta^5$-pregnene according to the Oppenauer techniques employing aluminum isopropoxide affords the corresponding progesterone (3-keto-$\Delta^4$) which when reacted according to our novel process with caproic anhydride in the presence of p-toluenesulfonic acid, for example, yields the novel 17α-acyloxyprogesterone, 16-butylidene-17α-caprooxyprogesterone, whereas treatment with hydrogen bromide in acetic acid would yield a 17-hydroxy compound of our invention, i.e. 16-butylidene-17α-hydroxyprogesterone.

Alternatively, a 16-alkyl-$\Delta^{16}$-intermediate (precursor of the necessary 16-alkyl-16,17-oxidoprogesterone intermediates) exemplified by 6,16-dimethyl-5,16-pregnadiene-3β-ol-20-one 3-acetate, is prepared from the known 6-methyl-5,16-pregnadiene-3β-ol-20-one 3-acetate by reaction with diazomethane yielding 6-methyl-16,17-pyrazolino-5,16-pregnadiene-3β-ol-20-one 3-acetate which is pyrolyzed at temperatures in the range of 200° C. to form the aforementioned 6,16-dimethyl-5,16-pregnadiene-3β-ol-20-one 3-acetate.

Iodine may be introduced in the 21-position of 16-alkylideneprogesterones such as 16-methyleneprogesterone by procedures which utilize iodine in the presence of an alkaline substance such as sodium hydroxide or calcium oxide, thus producing 21-iodo-16-alkylideneprogesterones of the general formula. The 17α-hydroxy-21-iodo substituted compound thus produced (e.g., 17α-hydroxy-21-iodoprogesterone) is conveniently converted to a 17α-acyloxyprogesterone by the usual esterification techniques.

The 21-fluoro-16-alkylidene progesterones are obtained from the corresponding 21-iodo analogs by the action of silver fluoride in moist acetonitrile. For example, 21-fluoro-16-methylene-17α-hydroxyprogesterone is derived from 21-iodo-16-methylene-17α-hydroxyprogesterone.

A 6-substituent is introduced into a 16-alkylideneprogesterone to form the novel 6-substituted-16-alkylidene-progesterones by employing known chemical techniques. Esterification of the 3-hydroxy group in a pregnenolone compound such as 16β-methyl-16α,17α-oxido-5-pregnene-3β-ol-20-one with, for example, acetic anhydride in pyridine, yields the corresponding 3-acyloxy ester, i.e. 16β - methyl - 16α,17α-oxido-5-pregnene-3β-ol-20-one 3-acetate. When the thus prepared 3-acetoxy ester is treated with acetic acid and hydrobromic acid for example, there is formed the corresponding 16-methylene-3β,17α-dihydroxy-5-pregnene-20-one 3 - acetate. Treatment of the latter compound with ethylene glycol by known procedures yields the 20-ethylene ketal derivative which, in turn, is epoxidized on treatment with a peracid such as peracetic or, preferably, monoperphthalic acid to give the epoxy derivative, 3β,17α-dihydroxy-5α,6α-epoxy-16-methylenepregnane-20-one 3-acetate 20-ethylene ketal. The 6-methyl substituent is introduced into the pregnane nucleus by the addition to this epoxy derivative of a Grignard reagent such as methyl magnesium iodide which, with subsequent hydrolysis, yields a 5α-hydroxy-6-methyl intermediate, e.g., 3β,5α,17α-trihydroxy-6β-methyl-16-methylenepregnane-20-one 20-ethylene ketal. Chromic acid oxidation converts the 3β-hydroxypregnane to the corresponding 3-ketopregnane, 5α,17α-dihydroxy-6β-methyl-16-methylenepregnane-3,20 - dione 20-ethylene ketal. A reagent such as ethanolic hydrochloric acid used on the aforementioned 3-ketopregnane simultaneously dehydrates the 5α-hydroxy group, epimerizes the 6β-substituent, and regenerates the 20-ketone to yield, for example, 6α-methyl-16-methylene-17α-hydroxyprogesterone. In order to obtain a 6β-configuration, a 5α-hydroxy-6β-substituted pregnane intermediate (e.g., 5α,17α-dihydroxy-6β-methyl-16-methylenepregnane-3,20-dione 20-ethylene ketal) is treated with, for example, thionyl chloride in a cold basic medium such as pyridine or in approximately 90% acetic acid to give 16-alkylideneprogesterones such as 6β-methyl-16-methylene-17α-hydroxyprogesterone 20-ethylene ketal or 6β-methyl-17α-hydroxy-16-methyleneprogesterone, respectively. A 6α-alkyl-16-alkylidene-progesterone may also be prepared from the corresponding 6β-substituted progesterone by means of alcoholic solutions of acids or bases such as ethanolic hydrogen chloride and ethanolic potassium hydroxide.

When preparing a 6-alkyl-16-alkylidene-17α-acyloxyprogesterone of our invention, the 6-substituent may first be introduced into a 17α-hydroxy starting compound, followed by esterification of the 6-substituted-17α-hydroxy-16-alkylideneprogesterone thereby formed. For example, 6α - methyl-16-methylene-17α-caprooxyprogesterone is obtained by first preparing 6α-methyl-16-methylene-17α-hydroxyprogesterone as shown above, followed by esterification by procedures heretofore described, such as with caproic acid in the presence of trifluoroacetic anhydride, yielding the corresponding 17α-acyloxyprogesterone, e.g., 6α-methyl-16-methylene-17α-caprooxyprogesterone. Alternatively, the 6-substituent is introduced into a 16-alkyl-16α,17α-oxido starting compound which is then reacted with an acid-acid anhydride mixture according to our process to give the corresponding 17α-acyloxyprogesterone. Thus, 6α,16β - dimethyl-16α,17α-oxidoprogesterone (prepared as shown in Example 10) when reacted with acetic anhydride and trifluoroacetic acid yields 6α-methyl-16-methylene-17α-acetoxyprogesterone.

Our 6-halogeno substituted progesterones are conveniently prepared from 16-methylene-17α-hydropregnenolones such as 16-methylene-5-pregnene-3β,17α-diol-20-one by addition of a halogenating agent across the 5,6-double bond followed by oxidation of the 3-hydroxyl function with, for example, chromic acid to the corresponding 3 - keto - 5,6-dihalogeno-16-methylenepregnane. Subsequent dehydrohalogenation of the latter intermediates with sodium acetate yields the novel 6-halogeno compound, i.e. 6β-halogeno-16-methylene-17α-hydroxyprogesterone.

When a 6-chloro-16-methyleneprogesterone is desired, a halogenating agent such as chlorine or bromine chloride is employed with a $\Delta^5$-pregnenolone such as 16-methylene-5-pregnene-3β,17α-diol-20-one to obtain the respective intermediates, 5,6 - dichloro-16-methylenepregnane-3β,17α-diol-20-one and 5-bromo-6-chloro-16-methylenepregnane-3β,17α-diol-20-one. Oxidation of the 3-hydroxy function with for example chromic acid to the corresponding 3-keto-5,6-dihalogenopregnane followed by dehydrohalogenation with sodium acetate yields the β-isomer, which in this case is 6β-chloro-16-methylene-17α-hydroxyprogesterone.

A 6β-fluoroprogesterone of our invention is similarly obtained by employing halogenating agents such as bromine fluoride or chlorine fluoride with 16-methylene-5 - pregnene - 3β,17α - diol - 20-one. The necessary intermediates thereby formed, i.e. 5-bromo-6-fluoro-16-methylene-17α-hydroxypregnane or 5-chloro-6-fluoro-16-methylene-17α-hydroxypregnane respectively, when subjected to the series of reactions outlined in the preceding paragraph yields 6β-fluoro-16-methylene-17α-hydroxyprogesterone.

The 6β-chloro and 6β-fluoroprogesterones prepared above may be epimerized to the 6α-isomer by means of alcoholic solutions of acids or bases yielding the corresponding 6α-chloro-16-methylene17α-hydroxyprogesterone and 6α-fluoro-16-methylene-17α-hydroxyprogesterone.

When utilizing reagents such as bromine fluoride, chlorine fluoride, chlorine or bromine chloride to prepare a 6-halogeno-17-acyloxyprogesterone, it is preferred to carry through the above-described reaction sequence on a compound having 17α-hydroxy group and to esterify the resulting 6-halogeno-17α-hydroxyprogesterone intermediate thereby formed by methods described above to obtain the desired 6-halogeno-16-methylene-17α-acyloxyprogesterone.

An alternate method of introducing a 6-chloro group into the molecule utilizes as starting compounds the 16-methylene-progesterones of our invention and reagents such as N-bromosuccinimide or N-chlorosuccinimide as the halogen donor. By this method 16-methylene-17α-acetoxy-21-fluoroprogesterone, for example, is converted to the corresponding 3-enol-ether-3,5-diene by means of ethyl-o-formate in the presence of an acid catalyst such as sulfuric acid. The 3-ethoxy-16-methylene-17α-acetoxy-21-fluoro-3,5-pregnadiene-20-one thus prepared when reacted with N-chlorosuccinimide, for example, in the presence of a solvent such as pyridine, with or without the aid of a catalyst such as p-toluenesulfuric acid, yields the 6β-epimer, 6β-chloro-16-methylene-17α-acetoxy-21-fluoroprogesterone. The corresponding 6α-chloro-16-methylene-17α-acetoxy-21-fluoroprogesterone is obtained from the aforementioned 6β-chloro compound by treatment with alcoholic hydrogen chloride. When N-bromosuccinimide is used in the foregoing procedure instead of N-chlorosuccinimide, the corresponding 6-bromo compound of our invention is formed, i.e. 6β-bromo-16-methylene-17α-acetoxy-21-fluoroprogesterone.

An alternate method of introducing a 6-fluoro group into the molecule employs perchloryl fluoride as the halogenating agent and as starting compounds either a 3-enol-ether-3,5-diene exemplified by the above described 3-ethoxy-16-methylene-17α-acetoxy-21-fluoro-3,5-pregnadiene-20-one, or a 3-enol-ester-3,5-diene such as 3,17-diacetoxy-16-methylene-3,5-pregnadiene-20-one. The latter intermediate is prepared from the corresponding 16-alkyl-16,17-oxidoprogesterone with an excess of acetic anhydride in the presence of p-toluenesulfonic acid according to a heretofore mentioned procedure. Specifically, 3,17-diacetoxy-16-methylene-3,5-pregnadiene-20-one reacted with perchloryl fluoride in a solvent such as pyridine yields 6β-fluoro-16-methylene-17α-acetoxyprogesterone. The corresponding 6α-fluoro-16-methylene-17α-acetoxyprogesterone is obtained from the 6β-fluoro epimer by treatment with alcoholic hydrogen chloride.

Novel progesterones of our invention possessing a hydrogen at C-17 are conveniently prepared by reacting a 16-alkylidene-17α-acyloxyprogesterone of the general formula with an alkaline or an alkaline earth metal such as lithium or calcium in a basic medium such as liquid ammonia or diethylamine, or by the action of zinc in aqueous ethanol. In the former procedure it is preferable that the 3-keto group be protected with a ketal derivative such as the ethylene ketal. For example, 16-ethylidene-17α-acetoxyprogesterone upon treatment with ethylene glycol is converted to the corresponding 3-ethylene ketal derivative (i.e. 3-ethylenedioxy-16-ethylidene-17α-acetoxy-5-pregnene-20-one) which when reacted with lithium in liquid ammonia gives 3-ethylenedioxy-16-ethylidene-5-pregnene-20-one. Hydrolysis with a mild acid such as aqueous acetic regenerates the 3-ketone group to give 16-ethylideneprogesterone.

The novel 9α,11β-dihalogeno-16-alkylideneprogesterones depicted by the general formula are prepared by reacting a suitable halogenating agent with a 16-alkylidene-4,9(11)-pregnadiene-3,20-dione or a 16-alkylidene-1,4,9(11)-pregnatriene-3,20-dione or with a 6, 17, or 21-monosubstituted, or a (6,17) (6,21), or (17,21)-disubstituted, or a 6,17,21-trisubstituted-16-alkylidene-4,9(11)-pregnadiene-3,20-dione, the preferred substituents at the 6-carbon being fluorine, chlorine or methyl; at the 17-carbon being hydroxy or acyloxy; and at the 21-carbon being fluorine or iodine. Our starting compounds are represented by $\Delta^{9,11}$-unsaturated progesterones such as 16-methylene-17α-hydroxy-4,9(11)-pregnadiene-3,20-dione,
16-methylene-17α-acetoxy-4,9(11)-pregnadiene-3,20-dione,
16-methylene-17α-caprooxy-4,9(11)-pregnadiene-3,20-dione,
16-methylene-1,4,9(11)-pregnatriene-17α-ol-3-one,
6β-fluoro-16-methylene-17α-hydroxy-4,9(11)-pregnadiene-3,20-dione,
6α-fluoro-16-methylene-17α-hydroxy-4,9(11)-pregnadiene-3,20-dione,
6α-chloro-16-methylene-17α-hydroxy-4,9(11)-pregnadiene-3,20-dione,
6α-methyl-16-methylene-17α-acetoxy-4,9(11)-pregnadiene-3,20-dione, and the like.

These starting materials necessarily possess a $\Delta^{9,11}$-double bond which may be introduced into the molecule either before or after the 16-methylene group is added to the progesterone nucleus. In either case the process of forming the double bond between C-9 and C-11 is identical, i.e. a hydroxyl group is introduced microbiologically at C-11 with the aid of microorganism, *Curvularia lunata* (N.R.R.L. 2380) or *Rhizopus nigricans* (A.T.C.C. 6227b) using procedures analogous to those in U.S. Patent No. 2,658,023 and U.S. Patent No. 2,602,769, respectively. When *Curvularia lunata* is employed the 11β-hydroxy steroid produced is dehydrated by a reagent such as methanesulfonyl chloride in pyridine or phosphorous oxychloride in pyridine to give the necessary intermediates. On the other hand, the action of *Rhizopus nigricans* on a progesterone such as 6α-methyl-16-methylene-17α-hydroxyprogesterone yields the corresponding 11α-hydroxy derivative, 6α-methyl-11α,17α-dihydroxy-16-methyleneprogesterone. Subsequent treatment with a sulfonylchloride such as methanesulfonyl chloride or toluenesulfonyl chloride yields the corresponding 11α-sulfonate which, when treated with a base such as pyridine or sodium acetate, gives the 9,11-dehydro intermediate exemplified by 6α-methyl-16-methylene-17α-hydroxy-4,9(11)-pregnadiene-3,20-dione (6α-methyl-16-methylene-17α-hydroxy-9(11)-dehydroprogesterone).

It is sometimes convenient to introduce the 9,11-bond prior to the 16-alkylidene group such as, for example, when one has an 11-hydroxy compound intermediate available such as 3β,11α-dihydroxy-5,16-pregnadiene-20-one. Selective esterification of the 3-hydroxyl group by means of pyridine and acetic anhydride yields 3β-acetoxy-11α-hydroxy-5,16-pregnadiene-20-one which is then esterified at C-11 with p-toulenesulfonyl chloride as described above. The resulting 11α-p-toluenesulfonate ester is dehydrated by means of sodium acetate and acetic acid to yield the 9,11-dehydro intermediate; 5,9(11),16-pregnatriene-3β-ol-20-one 3-acetate. A 16-alkyl group is then introduced according to the previously described procedures such as that utilizing diazomethane followed by pyrolysis of the intermediary 16,17-pyrazolino compound to yield 16-methyl-5,9(11),16-pregnatriene-3β-ol-20-one 3-acetate. The 16,17-epoxide is conveniently obtained from the latter compound by hydrogen peroxide in alkali. The resultant 16-alkyl-16,17-epoxy intermediate, e.g., 16β-methyl-16α,17α-oxido-5,9(11)-pregnadiene-3β-ol-20-one is converted by means of hydrogen bromide in acetic acid, for example, to the corresponding 16-methylene-5,9(11)-pregnadiene-3β,17α-diol-20-one, a necessary intermediate for producing dihalogen-alkylideneprogesterones of our invention. Alternatively, the aforementioned 5,9(11)-pregnadiene, 16β-methyl-16α,17α-oxido-5,9(11)-pregnadiene-3β-ol-20-one may be converted to the corresponding progesterone (Δ⁴-3-keto) via an Oppenauer oxidation to give 16β-methyl-16α,17α-oxido-9(11)-dehydroprogesterone. Treatment of this 16-alkyl-16,17-oxido intermediate with acetic acid and trifluoroacetic acid according to our novel process yields the corresponding 16 - methylene - 17α - acetoxy - 9 - (11) - dehydroprogesterone.

In preparing 9,11-dihalogeno compounds which contain 17α-acyloxy groups it is possible to introduce the Δ⁹,¹¹-bond into a 17α-hydroxyprogesterone and then esterify the 17-hydroxyl group either before or after introducing halogen at the 9 and 11-positions. For example, 9α,11β-dichloro-16-methylene-17α-acetoxyprogesterone may be prepared by two routes. In one, 16-methylene-17α-acetoxy-9(11)-dehydroprogesterone is prepared as described in the preceding paragraph or, alternatively, 16-methylene-17α-hydroxy-9(11)-dehydroprogesterone is converted by known techniques to the aforementioned 17-acetate ester which is then chlorinated at C-9 and C-11 with, for example, lithium chloride, hydrogen chloride and N-chlorosuccinimide. Alternatively, 16-methylene-17α-hydroxy-9(11)-dehydroprogesterone is chlorinated with chlorine and pyridine in carbon tetrachloride, for example, to give the novel 9α,11β-dichloro-16-methylene-17α-hydroxy-progesterone. Esterification with acetic acid and trifluoroacetic anhydride yields the desired 9α,11β-dichloro-16-methylene-17α-acetoxyprogesterone.

In general, the 9α,11β-dihalogeno compounds of the general formula are prepared from the above-mentioned 9(11)-dehydroprogesterone intermediates by utilizing halogenating reagents under reaction conditions described in U.S. Patent No. 2,894,963 and in the copending applications of Robinson and Gould et al., Ser. Nos. 817,079 now U.S. 3,009,933 and 817,048, now U.S. 3,049,554 respectively, both filed June 1, 1959.

Our 9α - halogeno - 11 - oxygenated - 16- alkylideneprogesterones are also conveniently prepared from the 16-alkylidene-9(11)-dehydroprogesterone intermediates described heretofore. For example, 6α-methyl-16-methylene-17α-acetoxy-4,9(11)-pregnadiene-3,20-dione when reacted with N-bromoacetamide in aqueous dioxane in the presence of perchloric acid according to known techniques yields the novel 6α-methyl-9α-bromo-11β,17α-dihydroxy-16-methyleneprogesterone 17-acetate.

Other 9α-halogeno-11β-hydroxyprogesterones of our invention, i.e., the 9α-iodo, chloro and fluoro are obtainable from the corresponding 9β,11β-oxido-16-alkylideneprogesterones which, in turn, are derived from the 9α-bromo-11β-hydroxy-16-alkylideneprogesterone by treatment with potassium acetate in ethanol or acetone. Addition of hydrogen chloride in chloroform or of hydrogen fluoride in chloroform-tetrahydrofuran, or of hydroiodic acid in acetic acid to a 9β,11β-oxido-progesterone yields the corresponding 9α-chloro-11β-hydroxy, 9α-fluoro-11β-hydroxy, or 9α-iodo-11β-hydroxy, respectively. Thus, 6α-methyl - 9α - bromo - 11β,17α - dihydroxy - 16 - methyleneprogesterone 17-acetate is converted to 6α-methyl-9β,11β-oxido-16-methylene-17α-hydroxyprogesterone 17-acetate. Addition of hydrogen fluoride to the oxide yields 6α-methyl-9α-fluoro-11β-hydroxy-16-methylene-17α-acetoxyprogesterone of our invention. By using hydrogen chloride or hydroiodic acid instead of hydrogen fluoride with the aforementioned oxidoprogesterone, there is obtained 6α-methyl-9α-chloro-11β-hydroxy-16-methylene-17α-acetoxyprogesterone and 6α-methyl-9α-iodo-11β-hydroxy-16-methylene-17α-acetoxyprogesterone.

Esterification of the 9α-halogeno-11β-hydroxy-16-alkylideneprogesterones of our invention by means of, for example, acetic acid and trifluoroacetic anhydride yields the corresponding 11-acylate, e.g., 11-acetate.

By utilizing the above procedure it is obvious that one needs but to choose the appropriate Δ⁹⁽¹¹⁾-intermediate to obtain compounds such as 9α-fluoro-11β,17α-diacetoxy-16-methyleneprogesterone; 6α,9α-difluoro-16-methylene-11β,17α-diacetoxyprogesterone; 6α-chloro-9α-fluoro-11β,17α-diacetoxy-16-methyleneprogesterone; 6α - methyl-9α-fluoro - 11β,17α-diacetoxy-16-methylene-1-dehydroprogesterone (6α-methyl-9α-fluoro-11β,17α-diacetoxy-16-methylene-1,4-pregnadiene-3,20-dione); 6-chloro-9α-fluoro-11β,17α-diacetoxy-16-methylene - 6 - dehydroprogesterone (6-chloro-9α-fluoro-11β,17α-diacetoxy - 16 - methylene-4,6-pregnadiene-3,20-dione).

To obtain the 11-keto compounds of the general formula the above 9,11-halohydrins such as 9α-fluoro-11β-hydroxy-17α-acetoxy-16-methyleneprogesterone may be oxidized with, for example, chromic acid to give as a representative example 9α-fluoro-11-keto-16-methylene-17α-acetoxyprogesterone.

In preparing the 1-dehydro analogs of the previously described 16-alkylideneprogesterones, 11-oxygenated-16-alkylideneprogesterones and the 9α,11β-dihalogeno-16-alkylideneprogesterones of our invention, the Δ¹-bond may be introduced at various stages during the synthesis of the compound and preferably in the later stages. Thus, a 16-alkylidene-1-dehydroprogesterone such as 16-methylene-17α-hydroxy-1,4-pregnadiene-3,20-dione, 6α - chloro-16-methylene-17α-acetoxy-1,4-pregnadiene-3,20-dione and 6α - methyl - 9α-fluoro-11β,17α-dihydroxy-16-methyleneprogesterone 17-acetate is prepared from the corresponding 16-alkylideneprogesterones, e.g. 16-methylene-17α-hydroxyprogesterone, 6α-chloro-16-methylene-17α-acetoxyprogesterone and 6α-methyl-9α-fluoro-11β,17α-dihydroxy-16-methyleneprogesterone 17-acetate by microbiological dehydrogenation with an organism such as *Corynebacterium simplex* (A.T.C.C. 6946) in a manner similar to that described in U.S. Patent No. 2,837,464 or by chemical dehydrogenation through the use of a reagent such as selenium dioxide. Similarly, 9α,11β-dihalogeno-16-alkylidene-1-dehydroprogesterones of the general formula are obtained from their corresponding 9α,11β-dihalogeno-16-alkylideneprogesterones, for example, 9α,11β-dichloro-21-fluoro - 16 - methylene-17α-hydroxyprogesterone is converted to 9α,11β-dichloro-21-fluoro-16-methylene-17α-hydroxy-1,4-pregnadiene-3,20-dione with the aid of *Corynebacterium simplex*. Alternatively, 9α,11β-dihalogeno-16-alkylidene-1-dehydroprogesterones are obtained by first dehydrogenating a 9(11)-dehydro-16-alkylideneprogesterone intermediate such as 6α-methyl-16-methylene-17α-hydroxy-9(11)-dehydroprogesterone with *Corynebacterium simplex* to give 6α-methyl-16-methylene-17α-hydroxy-1,4,9(11)-pregnatriene-3,20-dione which upon chlorination by previously described methods yields 6-methyl-16-methylene-9α,11β-dichloro-17α-hydroxy-1-dehydroprogesterone. The 17α-hydroxypregnadiene thus produced may then be converted to the 17-acyloxy compound by known esterification techniques to 6-methyl-16-methylene-9α,11β-dichloro-17α-acetoxy-1-dehydroprogesterone.

The 6-dehydro analogs of the 16-alkylideneprogesterones described above are obtained by subjecting the corresponding progesterone to the oxidizing action of chloranil. The novel 6α-methyl-16-methylene-17α-acetoxyprogesterone is transformed by means of chloranil to the 6-dehydro analog, 6-methyl-16-methylene-17α-acetoxy-6-dehydroprogesterone (6-methyl-16-methylene-17α-hydroxy-4,6-pregnadiene-3,20-dione 17-acetate). In like manner, 6α-chloro-16-methylene-17α-acetoxyprogesterone, 6α-fluoro-16-methylene-17α-acetoxyprogesterone, 6α-chloro-21-fluoro-16-methylene-17α-acetoxyprogesterone, and 6,21-difluoro-16-methylene-17α-acetoxyprogesterone are converted to 6-chloro-16-methylene-17α-acetoxy-6-dehydroprogesterone, 6-fluoro-16-methylene-17α-acetoxy-6-dehydroprogesterone, 6-chloro - 21 - fluoro-16-methylene-17α-acetoxy - 6 - dehydroprogesterone, and 6,21-difluoro-16-methylene-17α-acetoxy-6-dehydroprogesterone.

The 16-alkylidene-1,6-bis-dehydroprogesterones of our invention are preferably prepared from the corresponding novel 16-alkylidene-6-dehydroprogesterones by known procedures utilizing selenium dioxide. For example, 6-chloro - 16 - methylene-17α-hydroxy-4,6-pregnadiene-3, 20-dione 17-acetate reacted with selenium dioxide and mercury in t-butyl alcohol and acetic acid yields 6-chloro-16-methylene-17α-hydroxy-1,4,6-pregnatriene-3,20 - dione 17 - acetate (6-chloro-16-methylene-17α-hydroxy-1,6-bisdehydroprogesterone 17-acetate).

The 19-nor analogs of our invention are obtained by pyrolysis of the heretofore described 16-alkylidene-1-dehydroprogesterones. For example, 16-methylene-17α-hydroxy-1-dehydroprogesterone (16-methylene-17α-hydroxy-1,4-pregnadiene-3,20-dione) is pyrolyzed either in the solid state or in an inert solvent to effect elimination of the 19-methyl and concomitant aromatization of ring-A. The 3,17α-dihydroxy-16-methylene-17β-acetyl-1,3,5(10)-estratriene thus obtained is converted to its 3-methyl ether with dimethylsulfate in alkaline methanol. The resultant 3-methoxy-16-methylene-17α-hydroxy-17β-acetyl-1,3,5(10)-estratriene is converted by means of ethylene glycol to the corresponding 20-ethylene ketal which is reacted with liquid ammonia and lithium in the presence of a proton donor (such as ethanol) and subsequently treated with a reagent such as methanolic hydrochloric acid to give 16-methylene-17α-hydroxy-19-norprogesterone. In the last step of the aforementioned procedure, if one employs oxalic acid instead of hydrochloric acid there is obtained an intermediary compound, 16-methylene-17α-hydroxy-19-nor-5(10)-pregnene-3,20-dione which upon stronger acid treatment is converted to the above 19-norprogesterone, 16-methylene-17α-hydroxy-19-nor-4-pregnene-3,20-dione. Esterification with trifluoroacetic anhydride and acetic acid yields 16-methylene-17α-acetoxy-19-norprogesterone. By substituting other lower alkanoic acids such as caproic or t-butylacetic for acetic acid in the esterification procedure, one obtains the corresponding 17-lower alkanoates, i.e. 16-methylene-17α-hydroxy-19-norprogesterone 17-caproate and 16-methylene-17α-hydroxy-19-norprogesterone 17-t-butylacetate.

The following compounds may be obtained from 16-methylene-17α-hydroxy-19-norprogesterone (prepared as above) by utilizing a series of reactions similar to those outlined heretofore for the corresponding 19-methyl analogs; 6α-methyl-16-methylene-17α-acetoxy-19-norprogesterone, 6α-fluoro-16-methylene-17α-hydroxy-19-norprogesterone, 6α-fluoro-16-methylene-17α-acetoxy-19-norprogesterone, 6α,21-difluoro-16-methylene-17α-hydroxy-19-norprogesterone, and 6α,21-difluoro-16-methylene-17α-acetoxy-19-norprogesterone. The 21-iodo analogs of the above compounds as well as the 9,11-dihalogeno (9α,11β-dichloro, 9α-chloro-11β-fluoro, and the like) derivatives are also obtained by the procedures described above.

Compounds other than the above described 16-alkylidene-1-dehydroprogesterones which may be subjected to pyrolysis include the 11α-hydroxylated 16-alkylidene progesterones of our invention, which are conveniently prepared from the corresponding 11-deoxy-progesterones of our invention by treatment with *Rhizopus nigricans*. For example, 6α-fluoro-11α,17α-dihydroxy-16-methyleneprogesterone (obtained by the action of *Rhizopus nigricans* on 6α-fluoro-16-methylene-17α-hydroxyprogesterone) may be transformed by microbiological dehydrogenation by means of *Corynebacterium simplex* to the 1-dehydro analog, 6α-fluoro-11α,17α-dihydroxy-16-methylene-1,4-pregnadiene3,20-dione, which is transformed via pyrolysis and subsequent chemical transformation as described above into 6α - fluoro - 11α,17α - dihydroxy-16-methylene-19-norprogesterone. By forming an 11-sulfonate acid ester such as 11-p-toluenesulfonate followed by reaction with sodium acetate and acetic acid according to procedures described heretofore, there is obtained 6α-fluoro - 16 - methylene-17α-hydroxy -9 (11)-dehydro-19-norprogesterone, a useful intermediate in the preparation of 9α,11β-dihalogeno derivatives such as 6α-fluoro-9α,11β-dichloro-16-methylene-17α-hydroxy-19 - norprogesterone, 6α,21 - difluoro - 9α,11β-dichloro-16-methylene-17α - hydroxy-19-norprogesterone, and the like.

The following examples are illustrative of the procedures employed in preparing the compounds of this invention but are not to be construed as limiting the scope thereof, the scope of our invention being limited only by the appended claims.

*Example 1.—16-methylene-17α-hydroxyprogesterone*

A. *16β-methyl-16α,17α-oxido - 5 - pregnene - 3 - ol-20-one.*—To a solution of 32 ml. of 50% aqueous sodium hydroxide in 125 ml. of water is added a solution of 164 g. of 16-methyl-5,16-pregnadiene-3β-ol-20-one in 500 ml. of chloroform and 1200 ml. of methanol. The mixture is cooled to below 25° C. and then there is added with stirring 225 ml. of 35% hydrogen peroxide. Stirring is continued for 48 hours and the mixture is acidified with acetic acid. A saturated solution of sodium sulfite is added until any excess peroxide is destroyed as determined by the iodide-starch test. The mixture is then steam distilled and the residue filtered. The solid is recrystallized from acetone to give 16β-methyl-16α,17α-oxido-5-pregnene-3β-ol-20-one, M.P. 188° C. $[α]_D^{25}$—20° (1% in dioxane).

B. *16β-methyl-16α,17α-oxidoprogesterone.* — 25 grams of 16β-methyl-16α,17α-oxido-5-pregnene-3β-ol-20-one are dissolved in 1725 ml. of toluene. About 175 ml. of toluene is distilled, then 375 ml. of freshly distilled cyclohexanone is added to the solution, followed by the dropwise addition over a five minute period of a solution of 12.5 g. of aluminum isopropoxide in dry toluene. The solution is refluxed for one hour under a Dean-Stark trap. 60 ml. of water is added cautiously and then the water is azeotroped off. The solution is cooled, filtered and the filtrate steam distilled. The suspension left after steam distillation is filtered. The solid residue is washed with water, dried and crystallized from isopropyl ether to give 16β-methyl-16α,17α-oxidoprogesterone, $$\lambda_{max.}^{EtOH} \ 240 \ m\mu \ (\epsilon \ 16,760)$$

M.P. 160–163° C.; $[α]_D + 118.0$ (dioxane).

C. *16 - methylene-17α-hydroxyprogesterone.*—A solution of 6.93 g. of 16β-methyl-16α,17α-oxidoprogesterone in 170 ml. of acetic acid is warmed to 35° C. A 10% solution of hydrobromic acid in acetic acid (1.7 ml.) is added. The reaction mixture is maintained at approximately 35–45° C. for 20 minutes, then is diluted with 2 l. of water. A precipitate results which is filtered, washed with water, dried at 60° C. and crystallized from acetone to give 16-methylene-17α-hydroxyprogesterone $$\lambda_{max.}^{EtOH} \ 240 \ m\mu \ (\epsilon \ 16,600)$$

M.P. 219–222° C.; $[α]_D + 17$ (dioxane).

*Example 2.—16-methylene-17α-hydroxyprogesterone 17-acetate*

One gram of 16-methylene-17α-hydroxyprogestrone is dissolved in 10 ml. of acetic acid. Argon gas is bubbled through the acetic acid solution and then, under anhydrous conditions, 1.99 ml. of trifluoroacetic anhydride is added. The solution is heated at 80–95° C. for 55 minutes, then is poured into ice-water. The resultant mixture is extracted with methylene chloride. The organic extracts are combined and, in turn, are extracted with 3% aqueous potassium carbonate and finally with water. The methylene chloride solution is dried over magnesium sulfate, filtered and evaporated to a residue which, upon trituration with acetone-isopropyl ether yields a solid, which is filtered and dried to give 16-methylene-17α-hydroxyprogesterone 17-acetate, $$\lambda_{max.}^{EtOH} \; 240 \; m\mu \; (\epsilon \; 17,300)$$

M.P. 227–227.5° C.; [α]$_D$ —51.8 (dioxane).

Alternatively, the compound of this example is prepared in the following manner. 8.8 grams of 16β-methyl-16α,17α-oxidoprogesterone (the compound of Example 1B) are dissolved in 88 ml. of acetic acid. Argon gas is gently bubbled through the solution to displace the air, then 17.5 ml. of trifluoroacetic anhydride is added. The resulting dark brown solution is warmed at 30–40° C. for about one hour under anhydrous conditions. The reaction mixture is then diluted with water and extracted with methylene chloride. The extracts are combined, washed with 3% aqueous sodium carbonate, then with water and is evaporated to a residue which is crystallized from acetone-ether to give 16-methylene-17α-hydroxyprogesterons 17-acetate.

Example 3.—16-methylene-17α-hydroxyprogesterone 17-caproate

A solution of 1 g. of 16β-methyl-16α,17α-oxidoprogesterone (the compound of Example 1B) is dissolved in 10 ml. of N-caproic acid and 2 ml. of trifluoroacetic anhydride. Argon gas is generally bubbled through the solution at a temperature of 80–95° C. for 55 minutes. Water is added to the reaction mixture which is then extracted with methylene chloride. The organic extracts are combined and, in turn, are extracted with 3% aqueous sodium hydroxide and finally with water. The methylene chloride phase is evaporated to a residue which is dissolved in hexane and chromatographed over Florisil. Eluates of 5% ether in 95% hexane through 35% ether in 65% hexane are combined and evaporated to a residue which is crystallized from ether-hexane to give 16-methylene-17α-hydroxyprogesterone 17-caproate, M.P. 124.5–127° C.

$$\lambda_{max.}^{EtOH} \; 239 \; m\mu \; (\epsilon \; 17,300)$$

[α]$_D$ —44.9 (dioxane).

Example 4.—16-methylene-17α-hydroxy-1,4-pregnadiene-3,20-dione

A solution of 1 g. of yeast extract (Difco) in 1 liter of tap water, the pH of which is adjusted to 6.9, is distributed among ten 300 ml. Erlenmeyer flasks and to each flask is added a loopful, 2 ml. of *Corynebacterium simplex* (A.T.C.C. 6946). The resulting suspensions are incubated at 30° C. on a shaking machine for 18 hours. One-half gram of 16-methylene-17α-hydroxyprogesterone (prepared as described in Example 1) is dissolved in 20 ml. of acetone and the resulting solution is distributed equally among the ten flasks containing the 18 hours growth of *Corynebacterium simplex*. The culture containing the progesterone is then incubated at 30° C. for 24 hours. At the end of 24 hours, the contents of the flasks are combined and extracted with a total of 3 liters of chloroform. The crude chloroform extract from the transformation is then concentrated to a residue which is crystallized from acetone-hexane to give 16-methylene-17α-hydroxy-1,4-pregnadiene-3,20-dione.

Example 5.—16-methylene-17α-hydroxy-1,4-pregnadiene-3,20-dione 17-acetate

In the manner described in Example 2, 1 g. of 16-methylene-17α-hydroxy-1,4-pregnadiene-3,20-dione is reacted with acetic acid and trifluoroacetic anhydride and purified in the described manner to give 16-methylene-17α-hydroxy-1,4-pregnadiene-3,20-dione 17-acetate.

Alternatively, the compound of this example is prepared in the following manner. 0.4 grams of 16-methylene-17α-hydroxy-progesterone 17-acetate (the compound of Example 2) is refluxed for 10 hours with stirring with 0.22 g. of selenium dioxide and 0.2 g. of mercury in 4 ml. of tert.-butanol and 0.8 ml. of acetic acid. The reaction solution is then diluted with water and extracted with methylene chloride. The methylene chloride extracts are combined and, in turn, are extracted with 6% aqueous solution of sodium bicarbonate, then evaporated to a residue which is crystallized from acetone-hexane to give 16-methylene-17α-hydroxy-1,4-pregnadiene-3,20-dione 17-acetate.

Example 6.—16-methylene-17α-hydroxy-21-iodoprogesterone 16-methylene-17α-hydroxyprogesterone (0.5 g.) (prepared as described in Example 1) is dissolved in 5.6 ml. of tetrahydrofuran and 3.4 ml. methanol. Calcium oxide (finely ground) (0.75 g.) and 0.75 g. of iodine are then added. The initial deep brown color slowly changes to pale yellow over a 35 minute period. After an additional hour the reaction solution is diluted with methylene chloride, filtered and then the filtrate is washed successively with a solution of 3% sodium iodide, then 4% sodium thiosulfate and with water. The organic solution is evaporated to a tan amorphous solid, which upon crystallization from acetone-hexane affords 16-methylene-17α-hydroxy-21-iodoprogesterone.

Example 7.—16-methylene-17α-hydroxy-21-fluoroprogesterone

To 0.5 g. of 16-methylene-17α-hydroxy-21-iodoprogesterone (the compound of Example 6) dissolved in 100 ml. of acetonitrile containing 1 ml. of water there is added a 50% aqueous solution of 1.5 g. of silver fluoride. The mixture is warmed at 30–40° C. for 4 hours, then filtered. The filtrate is poured into water. The resulting solid is filtered and crystallized from acetone-hexane to give 16-methylene-17α-hydroxy-21-fluoroprogesterone.

Example 8.—16-methylene-17α-hydroxy-21-fluoroprogesterone 17-acetate

A. *16β-methyl-16α,17α-oxido-21-iodoprogesterone.*—In a manner similar to that described in Example 6, 16β-methyl-16α,17α-oxidoprogesterone (the compound of Example 1B) is iodinated to give 16β-methyl-16α,17α-oxido-21-iodoprogesterone.

B. *16β-methyl-16α,17α-oxido-21-fluoroprogesterone.*—In a manner similar to that described in Example 7, 16β-methyl-16α,17α-oxido-21-iodoprogesterone is reacted with silver fluoride in wet acetonitrile. The resultant product is isolated in the described manner and crystallized from acetone-hexane to give 16β-methyl-16α,17α-oxido-21-fluoroprogesterone.

C. *16-methylene-17α-hydroxy-21-fluoroprogesterone 17-acetate.*—In a manner similar to that described in Example 2, 16β-methyl-16α,17α-oxido-21-fluoroprogesterone is esterified by means of acetic acid and trifluoroacetic anhydride to give 16-methylene-17α-hydroxy-21-fluoroprogesterone 17-acetate.

In a similar manner, by substituting other lower alkanoic acids such as caproic acid and propionic acid for acetic acid in the procedure described in Example 8C there is obtained the corresponding 17-caproate and 17-propionate esters, i.e., 16-methylene-17α-hydroxy-21-fluoroprogesterone 17-caproate and 16-methylene-17α-hydroxy-21-fluoroprogesterone 17-propionate, respectively.

Example 9.—6β-methyl-16-methylene-17α-hydroxyprogesterone

A. *16β-methyl-16α,17α-oxido-5-pregnene-3β-ol-20-one 3-acetate.*—To a solution of 167 g. of 6β-methyl-16α,17α-oxido-5-pregnene-3β-ol-20-one (the compound of Example 1A) in 500 ml. of pyridine is added 170 ml. of acetic anhydride. The mixture is stirred at 60° C. overnight. The mixture is then cooled, 3 liters of water is added and the mixture is filtered to yield 16β-methyl-16α,17α-oxido-5-pregnene-3β-ol-20-one 3-acetate, M.P. 180–182° C., [α]$_D^{25}$ —16.7 (1% in dioxane).

B. *16-methylene-5-pregnene-3β,17α-diol-20-one 3-ace-* tate.—To a solution of 110 g. of 16β-methyl-16α,17α-oxido-5-pregnene-3β-ol-20-one 3-acetate in 2.4 liters of acetic acid is added 2.5 g. of hydrogen bromide. The mixture is stirred at 30° C. for a few minutes. Ten volumes of water are added and the resulting precipitate is removed by filtration, washed with aqueous acetic acid and dried to yield 16-methylene-5-pregnene-3β,17α-diol-20-one 3-acetate, M.P. 200° C., [α]_D^25—109.5° (1% in dioxane).

C. *16-methylene-5-pregnene-3β,17α-diol-20 - one 3-acetate 20-ethylene ketal.*—A solution of 16-methylene-5-pregnene-3β,17α-diol-20-one 3-acetate (1.0 g.) in a mixture of 234 ml. of benzene, 21.4 ml. of ethylene glycol and 55 mg. of p-toluenesulfonic acid is refluxed with stirring under a Dean-Stark take-off adapter for 18 hours. The reaction mixture is cooled, and 0.35 g. of sodium hydroxide is added. The two liquid phases are separated, the aqueous phase being diluted with water and extracted with benzene. The benzene extracts are combined with the organic layer and washed with water and evaporated to a solid residue which is crystallized from ether to give 16-methylene-5-pregnene-3β,17α-diol-20-one 3-acetate 20-ethylene ketal.

D. *5α,6α - oxido - 16 - methylenepregnane - 3β,17α-diol-20-one 3-acetate 20-ethylene ketal.*—A solution of 0.3 g. of 16-methylene-5-pregnene-3β,17α-diol-20-one 3-acetate 20-ethylene ketal in 1.5 ml. of chloroform is chilled to approximately 0° C. and 0.8 ml. of perphthalic acid in ether (concentration 205 mg./ml.) is added. The reaction solution is left at 0° C. for two hours, then diluted with methylene chloride and washed with 2% aqueous sodium hydroxide, and then with water. The organic solution is dried over magnesium sulfate, filtered and evaporated to a residue which is crystallized from isopropyl ether to give 5α,6α-oxido-16-methylenepregnane-3β,17α-diol-20-one 3-acetate 20-ethylene ketal.

E. *6β - methyl - 16 - methylenepregnane - 3β,5α,17α-triol-20-one 20-ethylene ketal.*—1.1 grams of the 5α,6α-oxidopregnane prepared in Example 9D dissolved in 22 ml. of tetrahydrofuran and 22 ml. of benzene is added to a Grignard reagent prepared from 1 g. of magnesium and 3.1 ml. of methyl iodide in 42 ml. of ether. The reaction mixture is heated to distill off the ether and then refluxed for 18 hours. Dilute aqueous ammonium chloride solution is added. The organic layer is separated, then washed with water and concentrated to a residue which is crystallized from acetone-hexane to give 6β-methyl-16-methylenepregnane-3β,5α,17α-triol-20-one 20-ethylene ketal.

F. *6β - methyl - 16 - methylene - 17α - hydroxyprogesterone.*—To 1.3 g. of the 6β-methylpregnane triol prepared in Example 9E suspended in 14 ml. of 80% acetic acid at 15–20° C. is added dropwise with stirring 0.385 g. chromic acid in 1.25 ml. of water. The reaction mixture is allowed to remain at room temperature overnight and then is poured into 50 ml. of ice water. The resulting precipitate is filtered, washed with water and dried at 60° C. The solid is dissolved in 5 ml. of acetic acid and 1 ml. of water, refluxed for 2 hours then diluted with water, and extracted with methylene chloride. The organic layer is washed to neutrality with water, dried over magnesium sulfate, filtered and evaporated to a residue which is crystallized from acetone-hexane to give 6β-methyl-16-methylene-17α-hydroxyprogesterone.

*Example 10.—6α-methyl-16-methylene-17α-hydroxyprogesterone*

A. A solution of 140 mg. of 6β-methyl-16-methylene-17α-hydroxyprogesterone (the compound of Example 9) in chloroform is cooled to −10° C., and a stream of anhydrous hydrogen chloride is introduced during a period of 2 hours keeping the solution temperature at −10° C. The chloroform solution is then washed with aqueous sodium bicarbonate solution and water, dried over magnesium sulfate, filtered, and evaporated to a residue which is crystallized from acetone-hexane to give 6α-methyl-16-methylene-17α-hydroxyprogesterone.

Alternatively, the compound of this example is prepared according to the method outlined below in procedures B–F.

B. *6 - methyl - 16,17 - pyrazolino - 5 - pregnene - 3β-ol-20-one 3-acetate.*—A solution of 3.5 g. of 6 - methyl-5,16-pregnadiene-3β-ol-20-one 3-acetate in 5 ml. of methylene chloride is added to a solution of approximately 1 g. of diazomethane in 65 ml. of ether which had been cooled to approximately −10° C. The mixture is kept at 0° C. for 5 hours, then allowed to warm up to room temperature. The excess diazomethane is displaced with a nitrogen stream and the reaction solution is evaporated to a residue which is crystallized from acetone-ether to give 6-methyl-16,17-pyrazolino-5-pregnene-3β-ol-20-one 3-acetate.

C. *6,16-dimethyl-5,16-pregnadiene-3β-ol-20-one 3-acetate.*—The 16,17-pyrazolino prepared in Example 10B is heated under reduced pressure at approximately 10 mm. vacuum until liquifaction occurs. The temperature and pressure is maintained until the evolution of nitrogen has ceased. The residual oil is then cooled to room temperature and crystallized from ether to give 6,16-dimethyl-5,16-pregnadiene-3β-ol-20-one 3-acetate.

D. *6,16β - dimethyl - 16α,17α - oxido - 5 - pregnene-3β-ol-20-one.*—To a solution of 1.5 g. 6,16-dimethyl-5,16-pregnandiene-3β-ol-20-one 3-acetate in 95 ml. of methanol at approximately 15° C. is added 3 ml. of 4 N sodium hydroxide followed by 6 ml. of 30% hydrogen peroxide solution. The mixture is allowed to remain at approximately 5° C. for 18 hours. The reaction solution is poured into 500 ml. of water and the resulting precipitate is filtered, dried and crystallized from acetone-hexane to give 6,16β-dimethyl-16α,17α-oxido-5-pregnene-3β-ol-20-one.

E. *6α,16β - dimethyl - 16α,17α - oxidoprogesterone.*—6,16β - dimethyl - 16α,17α - oxido - 5 - pregnene - 3β-ol-20-one (0.5 g.) is dissolved in 35 ml. of toluene. After collecting by distillation approximately 4 ml. of toluene, 7.5 ml. of freshly distilled cyclohexanone is added, followed by the dropwise addition of a solution of 0.25 g. of aluminum isopropoxide in dry toluene. The solution is refluxed for 1 hour under a Dean-Stark trap, then 1.2 ml. of water is added cautiously, and then the water azeotroped off. The solution is cooled, filtered and the toluene and cyclohexanone are removed by steam distillation. The resulting solid is filtered, washed with water, dried and crystallized from isopropyl ether to give 6α,16β-dimethyl-16α,17α-oxidoprogesterone.

F. *6α - methyl - 16 - methylene - 17α - hydroxyprogesterone.*—In a manner similar to that described in Example 1C, 6α,16β-dimethyl-16α,17α-oxidoprogesterone is reacted with a 10% solution by hydrobromic acid in acetic acid and the resultant product isolated and purified as described to give 6α-methyl-16-methylene-17α-hydroxyprogesterone.

The 17-acetate ester of the compound of this example is prepared from 6α,16β-dimethyl-16α,17α-oxidoprogesterone by the alternate procedure of Example 2 to give 6α-methyl-16-methylene-17α-hydroxyprogesterone 17-acetate.

*Example 11.—6α-methyl-16-methylene-17α-hydroxy-21-iodoprogesterone*

6α-methyl-16-methylene-17α-hydroxyprogesterone (the compound of Example 10) is iodinated in the manner described in Example 6 and the resultant product isolated and purified to give 6α-methyl-16-methylene-17α-hydroxy-21-iodoprogesterone.

*Example 12.—6α-methyl-16-methylene-17α-hydroxy-21-fluoroprogesterone*

In the manner described in Example 7, 6α-methyl-16-methylene-17α-hydroxy-21-iodoprogesterone is reacted with silver fluoride in moist acetonitrile and the resultant product isolated and purified to give 6α-methyl-16-methylene-17α-hydroxy-21-fluoroprogesterone.

Example 13.—Preparation of esters

In a manner similar to that described in Example 2, the 17α-hydroxy compounds of Examples 4–7 and 9–12 are each reacted with acetic acid and trifluoroacetic anhydride to yield respectively, 16-methylene-17α-hydroxy-1,4-pregnadiene-3,20-dione 17-acetate, 16-methylene-17α-hydroxy-21-iodoprogesterone, 17-acetate, 16-methylene-17α-hydroxy-21-fluoroprogesterone 17-acetate, 6β-methyl-16-methylene - 17α - hydroxyprogesterone 17-acetate, 6α-methyl-16-methylene-17α-hydroxyprogesterone 17-acetate, 6α - methyl - 16 - methylene - 17α - hydroxy - 21 - iodoprogesterone 17-acetate, and 6α-methyl-16-methylene-17α-hydroxy-21-fluoroprogesterone 17-acetate.

Similarly by substituting other lower alkanoic acid esters such as caproic or propionic acid for acetic acid in the above-described procedure, the corresponding 17-lower alkanoates are obtained.

Example 14.—6-methyl-16-methylene-17α-hydroxy-4,6-pregnadiene-3,20-dione 17-acetate Two grams of 6α-methyl-16-methylene-17α-hydroxyprogesterone 17-acetate (prepared as described in Example 13) and 5 g. of chloranil in 60 ml. of ethyl acetate and 15 ml. of acetic acid are heated at reflux temperature for 13 hours under an atmosphere of nitrogen. The reaction mixture is evaporated to a residue and extracted with ethyl acetate. The organic extracts are combined with cold 7% aqueous sodium hydroxide, then with water, dried over magnesium sulfate, filtered and evaporated to a residue which is crystallized from acetone-hexane to give 6 - methyl - 16 - methylene - 17α - hydroxy - 4,6 - pregnadiene-3,20-dione 17-acetate.

Example 15.—6α-chloro-16-methylene-17α-hydroxyprogesterone

A. *3β,17α - dihydroxy - 16 - methylene - 5 - pregnene-20-one.*—One gram of 3β,17α-dihydroxy-16-methylene-5-pregnene-20-one 3-acetate (the compound of Example 9B) is dissolved in 25 ml. of methanol and 5 ml. of water containing 0.2 g. of potassium bicarbonate. This solution is refluxed for ½ hour, then concentrated in vacuo. Water is added to the residue and the resultant precipitate is filtered, dried and crystallized from acetone-hexane to give 3β,17α - dihydroxy - 16 - methylene - 5 - pregnene - 20-one.

B. *3β,17α - dihydroxy - 5,6 - dichloro - 16 - methylene-pregnane-20-one.*—A solution containing 5.8 g. of 3β,17α-dihydroxy-16-methylene-5-pregnene-20-one and 3.5 ml. of pyridine in 200 ml. of chloroform is cooled to —25° C. To this stirred solution is added dropwise over a 15-minute period 1.16 g. of chlorine contained in 20 ml. of carbon tetrachloride. With continued stirring, the reaction solution is allowed to warm to approximately 15° C., then washed successively with dilute hydrochloric acid, water, aqueous sodium thiosulfate, and water. The organic phase is dried over magnesium sulfate, filtered, and the filtrate evaporated to a residue which is treated with methanol to give 3β,17α - dihydroxy - 5,6 - dichloro-16-methylene-pregnane-20-one.

C. *5,6 - dichloro - 16 - methylene - 17α - hydroxypregnane-3,20-dione.*—To a stirred solution of 1.3 g. of 3β,17α-dihydroxy-5,6-dichloro-16-methylenepregnane-20 - one in 3.0 ml. of acetic acid and 0.4 ml. of water at 10° C. is added over a 10-minute period a solution containing 0.35 g. of chromium trioxide in 1 ml. of acetic acid and 1 ml. water, followed by 0.012 ml. of concentrated sulfuric acid. The reaction mixture is stirred for 30 minutes, then diluted with water and extracted with chloroform. The combined chloroform extracts are washed with water, aqueous sodium bicarbonate and finally with water. The chloroform solution is dried and evaporated to a residue substantially of 5,6-dichloro-16-methylene-17α-hydroxy-pregnane-3,20-dione which is used without further purification in the following reaction.

D. *6β-chloro-16-methylene-17α-hydroxyprogesterone.*— The 5,6-dichloro-3-ketopregnane of Example 15C (1.9 g.) is refluxed in 85.5 ml. ethanol in the presence of 2.05 g. of anhydrous sodium acetate for 2 hours. The reaction solution is evaporated to a residue to which water is added. A solid separates which is filtered, dried over magnesium sulfate, and crystallized from acetone-hexane to give 6β-chloro-16-methylene-17α-hydroxyprogesterone.

E. *6α - chloro - 16 - methylene - 17α - hydroxyprogesterone.*—6β-chloro - 16 - methylene - 17α - hydroxyprogesterone (150 mg.) is dissolved in 30 ml. of chloroform and the solution is cooled to —10° C. A stream of anhydrous hydrogen chloride is bubbled through the solution during a period of 2 hours while maintaining the temperature at —10° C. The chloroform solution is washed with sodium bicarbonate solution and water, then dried and evaporated to a residue. Crystallization from acetone-hexane gives 6α-chloro-16-methylene-17α-hydroxyprogesterone.

Example 16.—6α-chloro-16-methylene-17α-hydroxyprogesterone 17-acetate

A. In a manner similar to that described in Example 2, the 17α-hydroxyprogesterone prepared in Example 15E is reacted with acetic acid and trifluoroacetic anhydride to give 6α-chloro-16-methylene-17α-hydroxyprogesterone 17-acetate.

Alternatively, the compound of this example is prepared as described in the following procedures B, C and D.

B. *3 - ethoxy - 16 - methylene - 17α - hydroxy - 3,5-pregnadiene - 20 - one 17 - acetate.*—A solution containing 0.32 g. of 16-methylene-17α-acetoxyprogesterone (the compound of Example 2), 0.342 ml. of ethyl-o-formate, 0.091 ml. of concentrated sulfuric acid, 0.0173 ml. of anhydrous ethanol and 3.73 ml. of dioxane is left at room temperature for 15 minutes. Pyridine (0.73 ml.) is added and the solution evaporated to a residue to which 5 ml. of methanol are added. A precipitate separates which is filtered and dried to give 3-ethoxy-16-methylene-17α-hydroxy-3,5-pregnadiene-20-one 17-acetate which is used without further purification in the following procedure.

C. *6β - chloro - 16 - methylene - 17α - hydroxyprogesterone 17-acetate.*—0.5 gram of the 3-ethoxypregnadiene of Example 16B and 0.2 g. of N-chlorosuccinimide are dissolved in 3.5 ml. of pyridine and 5 ml. of water are heated on the steam bath for one hour. The reaction solution is cooled, poured into water and acidified with hydrochloric acid. The aqueous mixture is extracted with methylene chloride. The organic extracts are combined, washed with water, dried over magnesium sulfate, filtered and evaporated to a residue of 6β-chloro-16-methylene-17α-hydroxyprogesterone 17-acetate which is used without further purification in the following procedure.

D. *6α-chloro-16-methylene - 17α - hydroxyprogesterone 17-acetate.*—In the manner of Example 15E, 6β-chloro-16-methylene-17α-hydroxyprogesterone 17-acetate is reacted with hydrogen chloride in chloroform and the resultant product isolated and purified to give 6α-chloro-16-methylene-17α-hydroxyprogesterone 17-acetate.

Example 17.—6α-chloro-16-methylene-17α-hydroxy-1,4-pregnadiene-3,20-dione 17-acetate.

In the manner of the alternative procedure of Example 5, 6α-chloro-16-methylene-17α-hydroxyprogesterone 17-acetate (the compound of Example 15) is reacted with selenium dioxide. The resultant product is isolated in the described manner and crystallized from acetone-hexane to give 6α-chloro-16-methylene-17α-hydroxy-1,4-pregnadiene-3,20-dione 17-acetate.

Example 18.—6α-chloro-21-fluoro-16-methylene-17α-hydroxyprogesterone 17-acetate A. *3-ethoxy-16-methylene-17α - hydroxy-21-fluoro-3,5-pregnadiene - 20 - one 17-acetate.*—16-methylene-17α-hydroxy-21-fluoroprogesterone 17-acetate (the compound of Example 8) is reacted with ethyl-o-formate in the manner of Example 16B. The resultant product is isolated in the described manner and crystallized from methanol to give 3-ethoxy-16-methylene-17α-hydroxy-21-fluoro-3,5-pregnadiene-20-one 17-acetate.

B. *6β-chloro-21-fluoro-16 - methylene - 17α - hydroxyprogesterone 17-acetate.*—The 3-ethoxy-3,5-pregnadiene of Example 18A is reacted with N-chlorosuccinimide in the manner of Example 16C. The compound is isolated in the described manner to give 6β-chloro-21-fluoro-16-methylene-17α-hydroxyprogesterone 17-acetate which is used without further purification in the following procedure.

C. *6α - chloro-21-fluoro-16-methylene - 17α - hydroxyprogesterone 17-acetate.*—6β-chloro-21-fluoro-16-methylene-17α-hydroxyprogesterone 17-acetate is reacted with anhydrous hydrogen chloride in chloroform in the manner of Example 15E. The resultant product is isolated in the described manner and crystallized from acetone to give 6α-chloro-21-fluoro-16-methylene-17α-hydroxyprogesterone 17-acetate.

*Example 19.—6α-fluoro-16-methylene-17α-hydroxyprogesterone 17-acetate*

A. *3β-hydroxy-5-bromo-6-fluoro - 16 - methylenepregnane-20-one.*—To a solution of 1.17 g. of 3β,17α-dihydroxy-16-methylene-5-pregnene-20-one (the compound of Example 15A) in 21 ml. of methylene chloride and 20.6 ml. of tetrahydrofuran at −70° C. there is added 0.46 g. of N-bromoacetamide and 16 g. of anhydrous hydrogen fluoride. The reaction mixture is kept at −70° C. for 2 hours, then is allowed to warm to approximately 0° C. and kept at 0° C. for 13 hours. The reaction mixture is then poured cautiously into chilled aqueous sodium carbonate solution containing sufficient sodium carbonate to neutralize the acidic reaction mixture and render it slightly basic. The resultant mixture is extracted with methylene chloride. The organic extracts are combined, washed with aqueous sodium carbonate, then water and is evaporated in vacuo to a residue which is crystallized from acetone to give 3β-hydroxy-5-bromo-6-fluoro-16-methylenepregnane-20-one.

B. *5α-bromo-6β-fluoro-16 - methylene - 17α - hydroxypregnane-3,20-dione.*—In the manner of Example 15C, 1.3 g. of the 5-bromo-6-fluoropregnane of Example 19A is reacted with chromic acid in the presence of sulfuric acid. The resultant product is isolated in the described manner to give 5α-bromo-6β-fluoro-16-methylene-17α-hydroxypregnane-3,20-dione which is used without further purification in the following procedure.

C. *6β-fluoro-16-methylene-17α-hydroxyprogesterone.*—In the manner described in Example 15D, 1.9 g. of the 5α-bromo-6β-fluoro-16-methylene-17α-hydroxypregnane-3,20-dione of Example 19B is reacted with sodium acetate and the resultant product isolated in the described manner. Crystallization from acetone-ether gives 6β-fluoro-16-methylene-17α-hydroxyprogesterone.

D. *6α-fluoro-16-methylene-17α-hydroxyprogesterone.*—In the manner of Example 15E, 6β-fluoro-16-methylene-17α-hydroxyprogesterone is reacted with anhydrous hydrogen chloride to give 6α-fluoro-16-methylene-17α-hydroxyprogesterone.

E. *6α-fluoro-16-methylene - 17α - hydroxyprogesterone 17-acetate.*—6α - fluoro - 16 - methylene - 17α - hydroxyprogesterone is reacted with acetic acid and trifluoroacetic anhydride in the manner of Example 2 to give 6α-fluoro-16-methylene-17α-hydroxyprogesterone 17-acetate.

Alternatively, the compound of this example is prepared as follows. Perchloryl fluoride is bubbled through a solution of 0.2 g. of 3-ethoxy-16-methylene-17α-hydroxy-3,5-pregnadiene-20-one 17-acetate (the compound of Example 16B) in 10 ml. of pyridine at −15° C. for 20 minutes. The reaction solution is poured into 15 volumes of ice water and acidified with hydrochloric acid. A solid results which is filtered, dried and crystallized from acetone-isopropyl ether to give 6β-fluoro-16-methylene-17α-hydroxyprogesterone 17-acetate. This 6β-fluoro compound is reacted with hydrogen chloride in the manner of Example 15E to give 6α-fluoro-16-methylene-17α-hydroxyprogesterone 17-acetate.

Other esters of the 17α-hydroxyprogesterone of Example 19D are obtained by substituting other lower alkanoic acids such as caproic and t-butylacetate for acetic acid in the process described in Example 2 to give respectively 6α-fluoro-16-methylene-17α-hydroxyprogesterone 17-caproate and 6α-fluoro-16-methylene-17-t-butylacetate.

*Example 20.—3β-hydroxy-5,9(11),16-pregnatriene-20-one 3-acetate*

A. *3β,11α-dihydroxy - 5,16 - pregnadiene - 20 - one 3-acetate.*—To a solution of 1.1 g. of 3β,11α-dihydroxy-5,16-pregnadiene-20-one in 10 ml. of dry pyridine is added 0.33 g. of acetic anhydride and the reaction mixture is allowed to remain at room temperature for 3 hours. Water is added and a precipitate results which is filtered, dried, and then crystallized from methanol to give 3β,11α-dihydroxy-5,16-pregnadiene-20-one 3-acetate.

B. *3β,11α-dihydroxy-5,16-pregnadiene-20-one 3-acetate 11-p-toluenesulfonate.*—A solution of 2.5 g. of 3β,11α-dihydroxy-5,16-pregnadiene-20-one 3-acetate in 10 ml. of chloroform and 14 ml. of dry pyridine is chilled in an ice-bath, then 2.5 g. of p-toluenesulfonyl chloride is added in small portions. The reaction mixture is stirred in the cold for 80 minutes, then allowed to warm to and remain at room temperature for 18 hours. The reaction mixture is then poured into ice-water, stirred and extracted with chloroform. The organic extracts are combined, washed with water, dried over magnesium sulfate, filtered and concentrated in vacuo to a residue which is crystallized from methanol to give 3β,11α-dihydroxy-5,16-pregnadiene-20-one 3-acetate 11-p-toluenesulfonate.

C. *3β-hydroxy-5,9(11),16 - pregnatriene - 20 - one 3-acetate.*—To a solution of 1.9 g. of anhydrous sodium acetate in 20 ml. of acetic acid, at about 105° C., is added 1.25 g. of 3β,11α-dihydroxy-5,16-pregnadiene-20-one 3-acetate 11-p-toluenesulfonate. The solution is refluxed for 40 minutes, then chilled in ice, and diluted with cold water. The resultant precipitate is filtered, washed with water, dried and crystallized from acetone-hexane to give 3β-hydroxy-5,9(11),16-pregnatriene-20-one 3-acetate.

*Example 21.—3β,17α-dihydroxy-16-methylene-5,9(11)-pregnadiene-20-one*

A. *3β-hydroxy-16,17-pyrazolino-5,9(11) - pregnadiene-20-one 3-acetate.*—In the manner of Example 10B, 3β-hydroxy-5,9(11),16-pregnatriene-20-one 3-acetate is reacted with diazomethane. The resultant product is isolated in the described manner and crystallized from acetone-hexane to give 3β-hydroxy-16,17-pyrazolino-5,9(11)-pregnadiene-20-one 3-acetate.

B. *3β-hydroxy - 16 - methyl-5,9(11),16-pregnatriene-20-one 3-acetate.*—The 16,17-pyrazolino-5,9(11)-pregnadiene of Example 21A is heated under reduced pressure in the manner of Example 10C. The resultant product is isolated in the described manner and crystallized from ethyl ether to give 3β-hydroxy - 16 - methyl-5,9(11),16-pregnatriene-20-one 3-acetate.

C. *3β-hydroxy - 16β - methyl-16α,17α-oxido-5,9(11)-pregnadiene-20-one.*—3β-hydroxy-16-methyl-5,9(11), 16-pregnatriene-20-one 3-acetate is reacted with alkaline hydrogen peroxide in the manner of Example 10D and the resultant product isolated in the described manner and crystallized from acetone-hexane to give 3β-hydroxy-16β-methyl-16α,17α,oxido-5,9(11)-pregnadiene-20-one.

D. *3β,17α-dihydroxy - 16 - methylene-5,9(11)-pregnadiene-20-one.*—In the manner of Example 1C, 3β-hydroxy-16β-methyl-16α,17α-oxido-5,9(11)-pregnadiene-20-one is reacted with acetic acid and hydrobromic acid. The resultant product is isolated as described and crystallized from acetone to give 3β,17α-dihydroxy-16-methylene-5,9(11)-pregnadiene-20-one.

*Example 22.—16-methylene-17α-hydroxy-4,9(11)-pregnadiene-3,20-dione*

A. *16β-methyl - 16α,17α-oxido - 4,9(11)-pregnadiene-3,20-dione.*—3β - hydroxy - 16β - methyl-16α,17α-oxido-5,9(11)-pregnadiene-20-one (the compound of Example 21C) is reacted with aluminum isopropoxide and cyclohexanone in toluene in the manner of Example 1B. The resultant product is isolated as described and crystallized from ether to give 16β-methyl-16α,17α-oxido-4,9(11)-pregnadiene-3,20-dione.

B. *16-methylene - 17α - hydroxy-4,9(11)-pregnadiene-3,20-dione.*—The 16α,17α-oxido-5,9(11)-pregnadiene of Example 22A is reacted with acetic acid and hydrobromic acid in the manner of Example 1C. The resultant product is isolated in the described manner and crystallized from acetone-hexane to give 16-methylene-17α-hydroxy-4,9(11)-pregnadiene-3,20-dione.

Alternatively, the compound of this example is prepared as described in procedures C–E.

C. *11α,17α-dihydroxy - 16 - methyleneprogesterone.*—16-methylene-17α-hydroxyprogesterone (the compound of Example 1) is microbiologically hydroxylated as follows. A culture of *Rhizopus nigricans* (A.T.C.C. 6227b) is maintained on 1% yeast extract, 1% cerelose agar at 28° C. Ten 300 ml. Erlenmeyer flasks each containing 100 ml. aliquots of the following sterile medium: 20 g. cerelose, 5 g. protease peptone No. 3, 5 g. soybean meal, 5 g. sodium chloride, 5 g. mono-potassium diacid phosphate and 3 g. yeast extract in sufficient water to provide a liter of solution and adjusted to pH 6.8 are inoculated with a spore suspension of *Rhizopus nigricans* from the agar slants and incubated on a shaker at 280 r.p.m. at 28° C. From 24–48 hours after inoculation, 25 mg. of 16-methylene-11α,17α-dihydroxyprogesterone in 100 ml. of methanol are added to each flask, and shaken at about 28° C. for a period of one to two days. The flasks are removed from the shaker when the conversion to the 11α-hydroxy steroid is completed, as indicated by a paper chromatography technique which is outlined by Bush, Journal of Biochemistry, 50, 370 (1952) and modified by Shull, "Paper Chromatography of Steriod Fermentation Products," 126th Meeting of the American Chemical Society, Sept. 12–17, 1954, New York, N.Y., Section 9A, paper No. 24. The contents of the flasks are combined and extracted with methylene chloride. The extracts are dried over sodium sulfate, filtered, and evaporated to a residue which is crystallized from acetone-hexane to give 11α,17α-dihydroxy-16-methyleneprogesterone.

D. *11α,17α - dihydroxy - 16 - methyleneprogesterone 11-p-toluene-sulfonate.*—In a manner similar to that of Example 20B, 11α,17α-dihydroxy-16-methyleneprogesterone is reacted with p-toluene-sulfonyl chloride in chloroform and pyridine. The resultant product is isolated in the described manner and is triturated with ethanol and filtered to give 11α,17α-dihydroxy-16-methylene-progesterone 11-p-toluenesulfonate which is used without further purification in the following procedure.

E. *16-methylene - 17α - hydroxy-4,9(11)-pregnadiene-3,20-dione.*—In a manner similar to that described in Example 20C, 2.5 g. of 11α,17α-dihydroxy-16-methyleneprogesterone 11-p-toluene sulfonate is reacted with 3.8 g. of anhydrous sodium acetate and 40 ml. of acetic acid. The resultant product is isolated in the described manner and crystallized from acetone-hexane to give 16-methylene-17α-hydroxy-4,9(11)-pregnadiene-3,20-dione.

*Example 23.—17α-hydroxy-16-methylene-4,9(11)-pregnadiene-3,20-dione-17-acetate*

In a manner similar to that of Example 2, 1 g. of 16-methylene - 17α - hydroxy-4,9(11)-pregnadiene-3,20-dione is reacted with acetic acid and trifluoroacetic anhydride to give 17α-hydroxy-16-methylene-4,9(11)-pregnadiene-3,20-dione 17-acetate.

*Example 24.—9α,11β-dichloro-16-methylene-17α-hydroxyprogesterone 17-acetate*

A. To a solution of 1.0 g. of 17α-hydroxy-16-methylene-4,9(11)-pregnadiene-3,20-dione 17-acetate and 4.0 g. of lithium chloride in 50 ml. of glacial acetic acid cooled to 10° C. is added 250 mg. of hydrogen chloride in 10 ml. of tetrahydrofuran followed by 0.5 g. of 93% N-chlorosuccinimide. The solution is stirred in the dark at room temperature for 20 minutes and then is poured into ice-water with stirring. A yellow precipitate separates, which is filtered, washed with water, triturated with ether and crystallized from acetone-hexane to give 9α,11β-dichloro-16-methylene-17α-hydroxyprogesterone 17-acetate.

B. Alternatively, the compound of this example is prepared as follows. To 1.0 g. of the 17α-hydroxy-16-methylene-4,9(11)-pregnadiene-3,20-dione 17-acetate dissolved in 35 ml. of carbon tetrachloride at 20° C., is added 2.1 ml. chlorine gas in carbon tetrachloride (111 mg. Cl₂/ml.) and 0.75 ml. of pyridine. The mixture is stirred at −20° C. for 20 minutes, then allowed to warm to room temperature over 40 minutes. The solution is filtered and the filtrate concentrated in vacuo to a residue which is triturated with ether. A solid results which is crystallized from acetone-hexane to give 9α,11β-dichloro-16-methylene-17α-hydroxyprogesterone 17-acetate.

A third method for preparing the compound of this example is described below in procedures C and D.

C. *9α,11β - dichloro-16-methylene-17α-hydroxyprogesterone.*—In the manner described in procedure B of this example, 16-methylene-17α-hydroxy-4,9(11)-pregnadiene-3,20-dione (the compound of Example 22) is reacted with chlorine in carbon tetrachloride in the presence of pyridine. The resultant product is isolated as described and crystallized from acetone-hexane to give 9α,11β-dichloro-16-methylene-17α-hydroxyprogesterone.

D. *9α,11β - dichloro - 16-methylene-17α-hydroxyprogesterone-17-acetate.*—In the manner of Example 2, the 17α-hydroxy-dichloroprogesterone of Example 24C is reacted with acetic acid and trifluoroacetic anhydride to give 9α,11β-dichloro-16-methylene-17α-hydroxyprogesterone 17-acetate.

*Example 25.—9α-bromo-11β-fluoro-16-methylene-17α-hydroxyprogesterone 17-acetate*

A. *9α - bromo - 11β-fluoro-16-methylene-17α-hydroxyprogesterone.*—To a solution of 1 g. of 16-methylene-17α-hydroxy-4,9(11)-pregnadiene-3,20-dione (the compound of Example 22) and 0.5 g. of N-bromoacetamide in 50 ml. of diethylacetic acid, there is added a solution of 0.5 g. of hydrogen fluoride in 4.7 ml. of a chloroform-tetrahydrofuran mixture (1:2). The solution is stirred at room temperature for 2 hours, then poured into ice water with stirring. The acid is neutralized by the addition of sodium bicarbonate and a precipitate form from which the aqueous solution is decanted. The precipitate is dried and then dissolved in acetone-ether and filtered through a column of Florisil in ether. The column is then eluted with ether. The combined ether eluates are evaporated to a residue which is crystallized from methylene chloride-hexane to give 9α-bromo-11β-fluoro-16-methylene-17α-hydroxyprogesterone.

B. *9α - bromo - 11β-fluoro-16-methylene-17α-hydroprogesterone-17-acetate.*—The 17α-hydroxy compound of Example 25A is reacted with acetic acid and trifluoroacetic anhydride in the manner of Example 2 to give 9α - bromo - 11β-fluoro-16-methylene-17α-hydroxyprogesterone 17-acetate.

Similarly, by substituting other lower alkanoic acids such as caproic and valeric for acetic acid in the above procedure, the corresponding 17-lower alkanoates are obtained, i.e., 9α-bromo-11β-fluoro-16-methylene-17α-hydroxyprogesterone-17-caproate and 9α-bromo-11β-fluoro-16-methylene-17α-hydroxyprogesterone 7-valerate, respectively.

*Example 26.—9α,11β-dichloro-16-methylene-17α-hydroxy-1,4-pregnadiene-3,20-dione 17-Acetate*

A. *16-methylene-17α-hydroxy-1,4,9(11)-pregnatriene-3,20-dione.*—In the manner described in Example 4, 16-methylene-17α-hydroxy-4,9(11)-pregnadiene-3,20-dione is subjected to the action of a culture of the microorganism *Corynebacterium simplex.* The resultant product is isolated as described and crystallized from ether to give 16-methylene-17α-hydroxy-1,4,9(11)-pregnatriene-3,20-dione.

B. *9α,11β-dichloro-16-methylene-17α-hydroxy-1,4-pregnadiene-3,20-dione.*—In the manner of Example 24B, 16-methylene-17α-hydroxy-1,4,9(11)-pregnatriene-3,20-dione is reacted with chlorine in carbon tetrachloride in the presence of pyridine. The resultant produce is isolated as described and crystallized from ethyl acetate-hexane to give 9α,11β-dichloro-16-methylene-17α-hydroxy-1,4-pregnadiene-3,20-dione.

C. *9α,11β-dichloro-16-methylene-17α-hydroxy-1,4-pregnadiene-3,20-dione 17-acetate.*—In the manner of Example 2, the 17α-hydroxy-1,4-pregnadiene of Example 26B is reacted with acetic acid and trifluoroacetic anhydride to give 9α,11β-dichloro-16-methylene-17α-hydroxy-1,4-pregnadiene-3,20-dione 17-acetate.

Alternatively, the compound of this example is prepared by reacting 9α,11β-dichloro-16-methylene-17α-hydroxyprogesterone 17-acetate (the compound of Example 24) with selenium dioxide in the manner similar to that described in the alternative procedure of Example 5.

*Example 27.—9α,11β-dichloro-21-fluoro-16-methylene-17α-hydroxyprogesterone 17-acetate*

A. *9α,11β-dichloro-21-iodo-16-methylene-17α-hydroxyprogesterone.*—In the manner of Example 6, 9α,11β-dichloro-16-methylene-17α-hydroxyprogesterone (the compound of Example 24C) is reacted with iodine and calcium oxide. The resultant product is isolated as described and crystallized from acetone to give 9α,11β-dichloro-21-iodo-16-methylene-17α-hydroxyprogesterone.

B. *9α,11β-dichloro-21-fluoro-16-methylene-17α-hydroxyprogesterone.*—The 9α,11β-dichloro-21-iodoprogesterone of Example 27A is reacted with silver fluoride in moist acetonitrile in the manner of Example 7. The resultant product is isolated as described and crystallized from ethyl acetate-hexane to give 9α,11β-dichloro-21-fluoro-16-methylene-17α-hydroxyprogesterone.

C. *9α,11β-dichloro-21-fluoro-16-methylene-17α-hydroxyprogesterone 17-acetate.* — The 17α-hydroxy-21-fluoroprogesterone of Example 27B is reacted with acetic acid and trifluoroacetic anhydride in the manner of Example 2 to give 9α,11β-dichloro-21-fluoro-16-methylene-17α-hydroxyprogesterone 17-acetate.

*Example 28.—6α-fluoro-16-methylene-17α-hydroxy-4,9(11)-pregnadiene-3,20-dione*

A. *3β,17α-dihydroxy-5α-bromo-6β-fluoro-16-methylene-9(11)-pregnene-20-one.* — 3β,17α-dihydroxy-16-methylene-5-9(11)-pregnadiene-20-one (the compound of Example 21) is reacted with N-bromoacetamide and hydrogen fluoride in the manner of Example 19A. The resultant product is isolated as described and crystallized from acetone-hexane to give 3β,17α-dihydroxy-5α-bromo-6β-fluoro-16-methylene-9(11)-pregnene-20-one.

B. *5α-bromo-6β-fluoro-16-methylene-17α-hydroxy-9(11)-pregnene-3,20-dione.*—3β,17α-dihydroxy-5α-bromo-6β-fluoro-16-methylene-9(11)-pregnene-20-one is oxidized with chromium trioxide in acetic acid and in the presence of sulfuric acid in the manner described in Example 15C. The resultant product is isolated as described to give 5α-bromo-6β-fluoro-16-methylene-17α-hydroxy-9(11)-pregnene-3,20-dione, which is used without further purification in the following procedure.

C. *6β-fluoro-16-methylene-17α-hydroxy-4,9(11)-pregnadiene-3,20-dione.*—According to the procedure of Example 15D, 5α-bromo-6β-fluoro-16-methylene-17α-hydroxy-9(11)-pregnene-3,20-dione is reacted with sodium acetate in ethanol. The resultant product is isolated as described and crystallized from ethyl acetate-hexane to give 6β-fluoro-16-methylene-17α-hydroxy-4,9(11)-pregnadiene-3,20-dione.

D. *6α-fluoro-16-methylene-17α-hydroxy-4,9(11)-pregnadiene-3,20-dione.*—The 6β-fluoro-4,9(11)-pregnadiene of Example 28C is reacted with anhydrous hydrogen fluoride in the manner of Example 15E. The resultant product is isolated as described and crystallized from acetone-hexane to give 6α-fluoro-16-methylene-17α-hydroxy-4,9(11)-pregnadiene-3,20-dione.

Alternatively, the compound of this example is prepared by subjecting 6α-fluoro-16-methylene-17α-hydroxyprogesterone (the compound of Example 19D) to the action of a culture of the organism *Rhizopus nigricans* in the manner described in Example 22C to give 6α-fluoro-11α,17α-dihydroxy-16-methyleneprogesterone which is esterified by means of p-toluenesulfonyl chloride in pyridine according to the procedure of Example 20B yielding 6α-fluoro-11α,17α-dihydroxy-16-methyleneprogesterone 11-p-toluenesulfonate. The action of the 11-p-toluenesulfonate ester with sodium acetate in the manner described in Example 20C yields 6α-fluoro-16-methylene-17α-hydroxy-4,9(11)-pregnadiene-3,20-dione.

*Example 29.—6α-fluoro-9α,11β-dichloro-16-methylene-17α-hydroxyprogesterone 17-acetate*

A. *6α-fluoro-9α,11β-dichloro-16-methylene-17α-hydroxyprogesterone.*—In a manner similar to that described in Example 24B, 6α-fluoro-16-methylene-17α-hydroxy-4,9(11)-pregnadiene-3,20-dione is reacted with chlorine in carbon tetrachloride and pyridine. The resultant product is isolated as described and crystallized from methylene chloride-hexane to give 6α-fluoro-9α,11β-dichloro-16-methylene-17α-hydroxyprogesterone.

B. *6α-fluoro-9α,11β-dichloro-16-methylene-17α-hydroxyprogesterone 17-acetate.*—In the manner of Example 2, 6α-fluoro-9α,11β-dichloro-16-methylene-17α-hydroxyprogesterone is reacted with acetic acid and trifluoroacetic anhydride to give 6α-fluoro-9α,11β-dichloro-16-methylene-17α-hydroxyprogesterone 17-acetate.

Alternatively, the compound of this example is prepared by esterifying 6α-fluoro-16-methylene-17α-hydroxy-4,9(11)-pregnadiene-3,20-dione with acetic acid and trifluoroacetic anhydride in the manner of Example 2 to give 6α-fluoro-16-methylene-17α-hydroxy-4,9(11)-pregnadiene-3,20-dione 17-acetate which, in turn, is chlorinated in the manner of Example 24A with N-chlorosuccinimide, hydrogen chloride and lithium chloride to give 6α-fluoro-9α,11β-dichloro-16-methylene-17α-hydroxyprogesterone 17-acetate.

A third method of preparing the compound of this example is described in following procedures C, D and E.

C. *3β-ethoxy-9α,11β-dichloro-16-methylene-17α-hydroxy-3,5-pregnadiene-20-one 17-acetate.*—9α,11β-dichloro-16-methylene-17α-hydroxyprogesterone 17-acetate (the compound of Example 24) is reacted with ethyl-o-formate in the manner of Example 16B. The resultant product is isolated as described and crystallized from methanol to give 3β-ethoxy-9α,11β-dichloro-16-methylene-17α-hydroxy-3,5-pregnadiene-20-one 17-acetate.

D. *6β-fluoro-9α,11β-dichloro-16-methylene-17α-hydroxyprogesterone 17-acetate.*—The 3-ethoxy-3,5-pregnadiene prepared in Example 29C is reacted with perchloryl fluoride in the manner described in the alternative procedure of Example 19E. The resultant product is isolated as described and crystallized from ethyl acetate-hexane to give 6β-fluoro-9α,11β-dichloro-16-methylene-17α-hydroxyprogesterone 17-acetate.

E. *6α - fluoro - 9α,11β - dichloro-16-methylene-17α-hydroxyprogesterone 17-acetate.*—The 6β-fluoroprogesterone of Example 29D is reacted with anhydrous hydrogen chloride in chloroform in the manner described in Example 15E to give 6α-fluoro-9α,11β-dichloro-16-methylene-17α-hydroxyprogesterone 17-acetate.

*Example 30.—6α,11β-difluoro-9-bromo-16-methylene-17α-hydroxyprogesterone 17-acetate*

6α - fluoro-16-methylene-17α-hydroxy-4,9(11)-pregnadiene-3,20-dione 17-acetate (prepared as described in the alternative procedure of Example 29B) is reacted with N-bromoacetamide and hydrogen fluoride in the manner of Example 25A. The resultant product is isolated as described and crystallized from methylene chloride-hexane to give 6α,11β-difluoro-9α-bromo-16-methylene-17α-hydroxyprogesterone 17-acetate.

The 17-acetate is hydrolyzed to the corresponding hydroxy compound in the manner of Example 15A to give 6α,11β-difluoro - 9α - bromo-16-methylene-17α-hydroxyprogesterone.

*Example 31.—6α,21-difluoro-9α,11β-dichloro-16-methylene-17α-hydroxyprogesterone-17-acetate*

A. *6α-fluoro-9α,11β-dichloro-21-iodo - 16 - methylene-17α-hydroxyprogesterone.*— 6α-fluoro-9α,11β - dichloro-16-methylene-17α-hydroxyprogesterone (the compound of Example 29A) is reacted with iodine and calcium oxide in the manner of Example 6. The resultant product is isolated as described and crystallized from acetone to give 6α-fluoro-9α,11β-dichloro - 21 - iodo-16 - methylene-17α-hyroxyprogesterone.

B. *6α,21-difluoro-9α,11β-dichloro-16-methylene - 17α-hydroxyprogesterone.*—In the manner of Example 7, the 21-iodoprogesterone compound of Example 31A is reacted with silver fluoride in moist acetonitrile. The resultant product is isolated as described and crystallized from ethyl acetate to give 6α,21-difluoro-9α,11β-dichloro-16-methylene-17α-hydroxyprogesterone.

C. *6α,21-difluoro-9α,11β - dichloro - 16 - methylene-17α-hydroxyprogesterone 17-acetate.*—In the manner of Example 2, 6α,21-difluoro-9α,11β-dichloro - 16 - methylene-17α-hydroxyprogesterone is reacted with acetic acid and trifluoroacetic anhydride to give 6α,21-difluoro-9α,11β-dichloro-16 - methylene - 17α - hydroxyprogesterone 17-acetate.

*Example 32.—6α-chloro-16-methylene-17α-hydroxy-4,9(11)-pregnadiene-3,20-dione*

A. *3β,17α-dihydroxy-5,6 - dichloro - 16 - methylene-9(11)-pregnene-20-one.*—3β,17α-dihydroxy - 16 - methylene-5,9(11)-pregnadiene-20-one (the compound of Example 21D) is reacted with chlorine in carbon tetrachloride and pyridine in theh manner described in Example 15B. The resultant product is isolated as described and crystallized from acetone to give 3β,17α-dihydroxy-5,6-dichloro-16-methylene-9(11)-pregene-20-one.

B. *5,6-dichloro-16-methylene - 17α - hydroxy-9(11)-pregnene-3,20-dione.*—3β,17α-dihydroxy - 5,6 - dichloro--16-methylene-9(11)-pregnene-20-one is reacted with chromium trioxide in acetic acid and in the presence of sulfuric acid in the manner of Example 15C. The resultant product is isolated as described to give 5,6-dichloro-16-methylene - 17α - hydroxy-9(11)-pregnene-3,20-dione which is used without further purification in the following procedure.

C. *6β-chloro - 16 - methylene - 17α-hydroxy-4,9(11)-pregnadiene-3,20-dione.*—5,6 - dichloro - 16 - methylene-17α - hydroxy-9(11)-pregnene-3,20-dione is reacted with sodium acetate in ethanol in the manner of Example 15D. The resultant product is isolated as described and crystallized from ethyl acetatae-hexane to give 6β-chloro-16-methylene - 17α - hydroxy-4,9(11) - pregnadiene - 3,20-dione.

D. *6α-chloro-16-methylene - 17α - hydroxy - 4,9(11)-pregnadiene-3,20-dione.*—In the manner of Example 15E, the 6β-chloro-4,9(11)-pregnadiene of Example 32C is reacted with anhydrous hydrogen chloride in chloroform. The resultant product is isolated as described and crystallized from acetone-hexane to give 6α-chloro-16-methylene-17α-hydroxy-4,9(11)-pregnadiene-3,20-dione.

Alternatively, the compound of this example is prepared by subjecting 6α-chloro - 16 - methylene - 17α - hydroxyprogesterone (the compound of Example 15E) to the action of a culture of the organism *Rhizopus nigricans* in the manner of Example 22C to give 6α-chloro-11α,17α-dihydroxy - 16 - methyleneprogesterone which, in turn, is esterified with p-toluenesulfonyl chloride and pyridine in the manner described in Example 20B to give 6α-chloro-11α,17α-dihydroxy - 16 - methyleneprogesterone 11 - p-toluenesulfonate. The 11 - p - toluenesulfonate ester is reacted with sodium acetate in acetic acid in the manner of Example 20C to give 6α-chloro-16-methylene-17α-hydroxy-4,9(11)-pregnadiene-3,20-dione.

*Example 33.—6α,9α,11β-trichloro-16-methylene-17α-hydroxyprogesterone 17-acetate*

A. *6α,9α,11β-trichloro - 16 - methylene - 17α-hydroxyprogesterone.*— 6α-chloro-16-methylene - 17α - hydroxy-4,9(11)-pregnadiene - 3,20 - dione (the compound of Example 32) is reacted with chlorine in carbon tetrachloride and pyridine in the manner of Example 24B. The resultant product is isolated as described and crystallized from acetone to give 6α,9α,11β-trichloro-16-methylene - 17α-hydroxyprogesterone.

Alternatively, the compound of this example (33A) is prepared by reacting 9α,11β - dichloro - 16 - methylene-17α - hydroxyprogesterone (the compound of Example 24C) with ethyl-o-formate in the manner of Example 16B to give 3-ethoxy-9α,11β-dichloro - 16 - methylene-17α - hydroxy - 3,5 - pregnadiene-20-one in turn, is reacted with N-chlorosuccinimide in pyridine in the manner described in Example 16C to give 6β,9α,11β-trichloro-16-methylene-17α - hydroxyprogesterone. By reacting the 6β,9α,11β-trichloroprogesterone thus obtained with hydrogen chloride in chloroform in the manner of Example 15E, there is obtained 6α,9α,11β-trichloro-16-methylene-17α-hydroxyprogesterone.

B. *6α,9α,11β-trichloro - 16 - methylene-17α-hydroxyprogesterone 17-acetate.*—In the manner similar to that described in Example 2, 6α,9α,11β-trichloro-16-methylene-17α-hydroxyprogesterone is esterified by means of acetic acid and trifluoroacetic anhydride to give 6α,9α,11β-trichloro-16-methylene-17α-hydroxyprogesterone 17-acetate.

By substituting other lower alkanoic acid esters such as caproic and propionic for acetic in the above procedure, the corresponding 17-lower alkanoates are obtained, i.e. 6α,9α,11β-trichloro - 16 - methylene - 17α - hydroxyprogesterone 17-caproate and 6α,9α,11β-trichloro-16-methylene-17α-hydroxyprogesterone 17-propionate, respectively.

Alternatively, the compound of this example is prepared by esterifying 6α - chloro - 16 - methylene-17α-hydroxy-4,9(11)-pregnadiene-3,20-dione by means of acetic acid and trifluoroacetic anhydride in the manner of Example 2 to give 6α-chloro-16-methylene-17α-hydroxy-4,9(11)-pregnadiene-3,20-dione 17-acetate which, in turn, is reacted with N-chlorosuccinimide, hydrogen chloride and lithium chloride in the manner of Example 24A to give 6α,9α,11β-trichloro-16 - methylene - 17α - hydroxyprogesterone 17-acetate.

*Example 34.—6α,9α-dichloro-11β-fluoro-16-methylene-17α-hydroxyprogesterone 17-acetate*

To 0.5 g. of 6α-chloro-16-methylene-17α-hydroxy-4,9(11)-pregnadiene-3,20-dione 17-acetate (prepared as described in the alternative procedure of Example 33B) in 25 ml. of diethylacetic acid is added 0.24 g. of N-chlorosuccinimide followed by a solution of 650 mg. of hydrogen fluoride in 3.4 ml. of a tetrahydofuran-chloroform mixture (1:2). The reaction mixture is stirred for 46 hours at room temperature, then poured into a dilute aqueous sodium carbonate solution. The mixture is extracted with methylene chloride and the organic extracts are combined and evaporated to a residue which is dissolved in ether and chromatographed on silica gel, then eluted with ether-hexane. The fractions collected by the 10% ether in hexane to the 50% ether in hexane eluates are combined and evaporated in vacuo to a residue which is crystallized from acetone-hexane to give 6α,9α-dichloro-11-β-fluoro-16-methylene-17α-hydroxyprogesterone 17-acetate.

*Example 35.—6α,9,11β-trichloro-21-fluoro-16-methylene-17α-hydroxyprogesterone 17-acetate*

A. *6α,9α,11β - trichloro-21-iodo-16-methylene-17α-hydroxyprogesterone.*—6α,9α,11β - trichloro - 16-methylene 17α-hydroxyprogesterone (the compound of Example 33A) is reacted with iodine and calcium oxide in the manner of Example 6. The resultant product is isolated as described and crystallized from aqueous acetone to give 6α,9α,11β - trichloro - 21-iodo-16-methylene-17α-hydroxyprogesterone.

B. *6α,9α,11β - trichloro - 21-fluoro-16-methylene-17α-hydroxyprogesterone.*—The trichloro - 21-iodoprogestone prepared in Example 35A is reacted with silever fluoride in moist acetonitrile in the manner described in Example 7. The resultant product is isolated as described and crystallized from methylene chloride-hexane to give 6α,9α,11β - trichloro-21-fluoro-16-methylene-17α-hydroxyprogesterone.

C. *6α,9α,11β - trichloro - 21-fluoro-16-methylene-17α-hydroxyprogesterone 17 - acetate.*—6α,9α,11β - trichloro-21-fluoro-16-methylene-17α-hydroxyprogesterone is reacted with acetic acid and trifluoroacetic anhydride in the manner of Example 2 to give 6α,9α,11β - trichloro - 21-fluoro - 16-methylene-17α-hydroxyprogesterone 17-acetate.

*Example 36.—6-methyl-16-methylene-17-hydroxy-4,9(11)-pregnadiene-3,20-dione 17-acetate*

A. *6α - methyl - 11α,17α - dihydroxy - 16 - methyleneprogesterone.*—6α - methyl - 16 - methylene - 17α - hydroxyprogesterone (the compound of Example 10) is subjected to the action of a culture of the organism *Rhizopus nigricans* in the manner of Example 22C. The resultant product is isolated as described and crystallized from ethyl acetate-hexane to give 6α-methyl-11α,17α-dihydroxy-16-methyleneprogesterone.

B. *6α - methyl - 11α,17α-dihydroxy - 16 - methyleneprogesterone 11-p-toluensulfonate.*—In the manner described in Example 20B, 6α-methyl-11α-17α-dihydroxy-16-methyleneprogesterone is reacted with p-toluenesulfonyl chloride and pyridine in chloroform. The resultant product is isolated as described and crystallized from ethanol to give 6α-methyl-11α,17α-dihydroxy - 16-methyleneprogesterone-11-p-toluenesulfonate.

C. *6α - methyl - 16 - methylene - 17α - hydroxy-4, 9(11)-pregnadiene-3,20-dione.*—In the manner of Example 20C, 6α-methyl-11α,17α-dihydroxy-16-methyleneprogesterone 11-p-toluenesulfonate is reacted with sodium acetate in acetic acid. The resultant product is isolated as described and crystallized from acetone-hexane to give 6α - methyl - 16 - methylene - 17α - hydroxy - 4, 9(11)-pregnadiene-3,20-dione.

D. *6α - methyl - 16 - methylene - 17α - hydroxy - 4, 9(11)-pregnadiene-3,20-dione 17-acetate.*—In a manner similar to that described in Example 2, the 17α-hydroxy-4,9(11)-pregnadiene of Example 36C is reacted with acetic acid and trifluoroacetic anhydride to give 6α-methyl-16-methylene - 17α - hydroxy-4,9(11)-pregnadiene-3,20-dione 17-acetate.

By substituting other lower alkanoic acids such as caproic and valeric for acetic acid in the above procedure, the corresponding 17-lower alkanoates are obtained, i.e. 6α - methyl - 16 - methylene - 17α-hydroxy - 4,9(11)-pregnadiene - 3,20-dione 17-caproate and 6α-methyl-16-methylene-17α-hydroxy-4,9(11)-pregnadiene-3,20 - dione 17-valerate.

*Example 37.—6α-methyl-9-chloro-11-fluoro-16-methylene-17α-hydroxyprogesterone 17-acetate*

6α - methyl - 16 - methylene - 17α - hydroxy - 4,9(11)-pregnadiene - 3,20 - dione 17 - acetate is reacted with N-chlorosuccinimide and hydrogen fluoride in the manner of Example 34. The resultant product is isolated as described and crystallized from acetone-hexane to give 6α-methyl - 9α - chloro - 11β - fluoro - 16 - methylene - 17α-hydroxyprogesterone 17-acetate.

*Example 38.—6α-methyl-9α,11β-dichloro-16-methylene-17α-hydroxyprogesterone 17-acetate*

A. *6α - methyl - 9α, 11β - dichloro - 16 - methylene-17α - hydroxyprogesterone.*—6α - methyl - 16 - methylene-17α - hydroxy - 4,9(11) - pregnadiene - 3,20 - dione (the compound of Example 36C) is reacted with chlorine in carbon tetrachloride and pyridine in the manner of Example 24B to give 6α-methyl-9α,11β-dichloro-16-methylene-17α-hydroxyprogesterone.

B. *6α - methyl - 9α, 11β - dichloro - 16 - methylene-17α - hydroxyprogesterone 16-acetate.*—The 17α-hydroxy-9α,11β - dichloroprogesterone of Example 38A is reacted with acetic acid and trifluoroacetic anhydride in the manner of Example 2 to give 6α-methyl-9α,11β-dichloro-16-methylene - 17α - hydroxyprogesterone 17 - acetate.

Alternatively, the compound of this example is prepared by reacting 6α - methyl - 16 - methylene - 17α - hydroxy-4,9(11) - pregnadiene - 3,20 - dione 17-acetate (the compound of Example 36) with N-chlorosuccinimide, hydrogen chloride and lithium chloride in the manner of Example 24A to give 6α-methyl-9α,11β-dichloro-16-methylene - 17α - hydroxyprogesterone 17-acetate.

*Example 39.—6α-methyl-9α-bromo-11β-fluoro-16-methlylene-17α-hydroxyprogesterone-17-acetate*

In the manner of Example 25, 6α-methyl-16-methylene-17α-hydroxy-4,9(11)-pregnadiene-3,20 - dione 17-acetate (the compound of Example 36) is reacted with N-bromoacetamide and hydrogen fluoride. The resultant product is isolated as described and crystallized from methylene chloride-hexane to give 6α-methyl-9α-bromo-11β-fluoro-16-methylene-17α-hydroxyprogesterone 17-acetate.

*Example 40.—6α-methyl-9α,11β-dichloro-21-fluoro-16-methylene-17-α-hydroxyprogesterone 17-acetate*

A. *6α-methyl-9α,11β-dichloro-21-iodo-16 - methylene-17α-hydroxyprogesterone.*—In the manner of Example 6, 6α-methyl-9α,11β-dichloro - 16 - methylene-17α-hydroxyprogesterone (the compound of Example 38A) is reacted with iodine and calcium oxide and the resultant product is isolated as described and crystallized from acetone-hexane to give 6α - methyl - 9α,11β - dichloro-21-iodo-16-methylene-17α-hydroxyprogesterone.

B. *6α-methyl-9α,11β-dichloro - 21-fluoro-16-methylene-17α-hydroxyprogesterone.*—In the manner of Example 7, 6α - methyl - 9α,11β-dichloro-21-iodo-16-methylene-17α-hydroxyprogesterone is reacted with silver fluoride in moist acetonitrile. The resultant product is isolated as described and crystallized from acetone to give 6α-methyl-9α,11β-dichloro-21 - fluoro - 16 - methylene-17α-hydroxyprogesterone.

C. *6α - methyl-9α,11β-dichloro-21-fluoro-16-methylene-17α-hydroxyprogesterone 17-acetate.*—The 17α-hydroxy-9α,11β-dichloro-21-fluoroprogesterone prepared in Example 40B is reacted with acetic acid and trifluoroacetic anhydride in the manner of Example 2 to give 6α-methyl-9α,11β-dichloro-21-fluoro-16 - methylene - 17α - hydroxyprogesterone 17-acetate.

*Example 41.—6α-methyl-9α-bromo-11β,17α-dihydroxy-16-methyleneprogesterone 17-acetate*

To a mixture of 0.2 g. of 6α-methyl-16-methylene-17α-hydroxy-4,9(11)-pregnadiene-3,20-dione 17-acetate (the compound of Example 36) in 20 ml. of dioxane (which has been purified by refluxing over sodium followed by distillation) and 2 ml. of water is added 0.07 g. of N-bromoacetamide and 1 ml. of 1.5 N perchloric acid. The mixture is allowed to stand for 2 hours, then a solution of 0.2 g. of sodium sulfite in 2 ml. of water is added and the mixture is extracted with methylene chloride. The organic extracts are combined, washed with water, dried over magnesium sulfate and evaporated to a residue which is crystallized from acetone to give 6α-methyl-9α-bromo-11β,17α-dihydroxy - 16-methyleneprogesterone 17-acetate.

In a similar manner, 6α-chloro-16-methylene-17α-hydroxy-4,9(11)-pregnadiene-3,20-dione (the compound of Example 32), 6α - fluoro - 16-methylene-17α-hydroxy-4,9(11)-pregnadiene-3,20-dione (the compound of Example 28), 16-methylene-17α-hydroxy-4,9(11)-pregnadiene-3,20-dione 17-acetate (the compound of Example 23), and 16-methylene-17α-hydroxy-4,9(11)-pregnadiene-3,20-dione (the compound of Example 22) are each reacted with N-bromosuccinimide and perchloric acid to yield respectively, 6α - chloro - 9α-bromo-11β,17α-dihydroxy-16-methyleneprogesterone, 6α-fluoro-9α-bromo - 11β,17α-dihydroxy-16-methyleneprogesterone, 9α-bromo-11β,17α-dihydroxy - 16 - methyleneprogesterone 17-acetate, and 9α-bromo-11β,17α-dihydroxy-16-methyleneprogesterone.

*Example 42.—6α-methyl-9α-fluoro-11β,17α-dihydroxy-16-methyleneprogesterone 17-acetate*

A. *6α - methyl-9β,11β-oxido - 16 - methylene - 17α-hydroxyprogesterone 17-acetate.*—To 0.3 g. of 6α-methyl-9α-bromo - 11β,17α-dihydroxy-16-methyleneprogesterone 17-acetate (the compound of Example 41) in 30 ml. of acetone is added 0.3 g. of potassium acetate. The reaction mixture is refluxed for 6 hours, then the acetone is distilled. Water is added to the resultant residue. A solid separates which is filtered and crystallized from methanol-water to give 6α-methyl-9β,11β-oxido-16-methylene-17α-hydroxyprogesterone 17-acetate.

B. *6α - methyl-9α-fluoro-11β,17α-dihydroxy-16-methyleneprogesterone 17-acetate.*—To 3.5 g. of hydrogen fluoride in 20 ml. of chloroform and 0.6 ml. of tetrahydrofuran at −10° C. is added 2 g. of 6α-methyl-9β,11β-oxido-17α-hydroxy-16-methyleneprogesterone 17-acetate. The reaction mixture is kept at −10° C. for 3 hours, then poured into aqueous sodium carbonate solution. The organic solvent layer is separated from the water and evaporated to a residue which is crystallized from methanol to give 6α-methyl-9α-fluoro-11β,17α-dihydroxy-16-methyleneprogesterone 17-acetate.

*Example 43.—6α-methyl-9α-chloro-11β,17α-dihydroxy-16-methyleneprogesterone 17-acetate*

A solution of 0.2 g. of 6α - methyl - 9β,11β - oxido-16-methylene-17α-hydroxyprogesterone 17-acetate (the compound of Example 42A) in 30 ml. of alcohol-free chloroform is saturated at 0° C. with anhydrous hydrogen chloride and the mixture allowed to stand at 0° C. for 6 hours. The solvent is distilled in vacuo from the reaction mixture leaving a residue which is crystallized from acetone to give 6α-methyl-9α-chloro-11β,17α-dihydroxy-16-methyleneprogesterone 17-acetate.

*Example 44.—6α-methyl-9α-fluoro-11-keto-16-methylene-17α-hydroxyprogesterone 17-acetate*

To 0.3 g. of 6α-methyl-9α-fluoro-11β,17α-dihydroxy-16-methyleneprogesterone 17-acetate (the compound of Example 42) in 15 ml. of acetic acid is added a solution of 60 mg. of chromium trioxide in .1 ml. of water and 3 ml. of acetic acid. The mixture is allowed to stand at room temperature for 6 hours, then water is added and the mixture is extracted with methylene chloride. The organic extracts are combined, washed with water, dried over magnesium sulfate, filtered and evaporated to a residue which is crystallized from methanol to give 6α-methyl-9α-fluoro-11 - keto - 16-methylene - 17α-hydroxyprogesterone 17-acetate.

*Example 45.—6α-methyl-9α-fluoro-11β,17α-dihydroxy-16-methyleneprogesterone 11,17-diacetate*

To 1 g. of 6α-methyl-9α-fluoro-11β,17α-dihydroxy-16-methyleneprogesterone 17-acetate (the compound of Example 42) is dissolved in 10 ml. of acetic acid. Argon gas is bubbled gently through the acetic acid solution and then 1.99 ml. of trifluoroacetic anhydride is added. The solution is heated at 95° C. for 55 minutes, after which it is poured into ice-water. The resultant mixture is extracted with methylene chloride. The organic extracts are combined and, in turn, extracted with 3% aqueous potassium carbonate and then water. The methylene chloride solution is dried over magnesium sulfate, filtered and evaporated to a residue which is crystallized from ethyl acetate to give 6α-methyl-9α-fluoro-11β,17α-dihydroxy-16-methyleneprogesterone 11,17-diacetate.

*Example 46.—Preparation of 6-dehydroprogesterones*

In the manner described in Example 14, 6α-chloro-16-methylene-17α-hydroxyprogesterone 17-acetate (the compound of Example 16) is reacted with chloranil in ethyl acetate and acetic acid. The resultant product is isolated as described and crystallized from methylene chloride to give 6-chloro-16-methylene-17α-hydroxy-4,6-pregnadiene-3,20-dione 17-acetate.

In a similar manner, 6α-chloro-21-fluoro-16-methylene-17α-hydroxy progesterone 17-acetate (the compound of Example 18), 6α-fluoro-16-methylene-17α-hydroxyprogesterone 17-acetate (the compound of Example 19), 6α,21-difluoro-9α,11β - dichloro-16-methylene - 17α-hydroxyprogesterone (the compound of Example 31B), 6α,9α,11β-trichloro-16-methylene - 17α-hydroxyprogesterone 17-acetate (the compound of Example 33), 6α,9α,11β-trichloro-21-fluoro - 16 - methylene-17α-hydroxyprogesterone (the compound of Example 35B), 6α,9α,11β-trichloro-21-fluoro-16-methylene-17α-hydroxyprogestrone 17-acetate (the compound of Example 35C), 6α-methyl-9α,11β-dichloro-16-methylene - 17α - hydroxyprogesterone 17-acetate (the compound of Example 38), and 6α-methyl-9α-fluoro-11β,17α-dihydroxy-16 - methyleneprogesterone 17-acetate (the compound of Example 42) are each reacted with chloranil to yield respectively 6-chloro-21-fluoro-16-methylene-17α-hydroxy - 4,6-pregnadiene - 3,20-dione 17-acetate, 6-fluoro-16-methylene-17α-hydroxy-4,6-pregnadiene-3,20-dione 17-acetate, 6,21-difluoro-9α,11β-dichloro-16-methylene-17α-hydroxy-4,6-pregnadiene-3,20-dione, 6,9α,11β-trichloro - 16-methylene-17α-hydroxy - 4,6-pregnadiene-3,20-dione 17-acetate, 6,9α,11β-trichloro-21-fluoro-16-methylene-17α-hydroxy-4,6-pregnadiene-3,20-dione, 6,9α,11β-trichloro - 21-fluoro-16-methylene - 17α-hydroxy-4,6-pregnadiene - 3,20-dione 17-acetate, 6-methyl-9α,11β-dichloro-16-methylene- 17α-hydroxy-4,6 - pregnadiene-3,20-dione 17-acetate, and 6-methyl-9α-fluoro-11β,17α-dihydroxy-16-methylene - 4,6-pregnadiene-3,20-dione 17-acetate.

*Example 47.—Preparation of 1-dehydroprogresterones*

In a manner similar to that described in the alternative procedure of Example 5, 6α-chloro-16-methylene-17α-hydroxyprogesterone 17-acetate (the compound of Example 16) is reacted with selenium dioxide and mercury in t-butyl alcohol and acetic acid. The resultant product is isolated and purified to give 6α-chloro-16-methylene-17α-hydroxy-1,4-pregnadiene-3,20-dione 17-acetate.

In a manner similar to that described above, 6α,9α,11β-trichloro-16-methylene-17α-hydroxyprogesterone 17-acetate (the compound of Example 33), 6α-methyl-9α,11β-dichloro-16 - methylene-17α - hydroxyprogesterone (the compound of Example 38A), 6α-methyl-9α,11β-dichloro-16-methylene-17α-hydroxyprogesterone 17-acetate (the compound of Example 38), 16-methylene-17α-hydroxy-21-fluoroprogesterone 17-acetate (the compound of Example 8), 6α-methyl-16 - methylene-17α - hydroxyprogesterone (the compound of Example 10), 9α,11β-dichloro-21-iodo-16-methylene-17α-hydroxyprogesterone (the compound of Example 27A), 9α-bromo-11β-fluoro-16-methylene-17α-hydroxyprogesterone 17-acetate (the compound of Example 30), 6α-methyl-9α-bromo-11β,17α-dihydroxy-16-methyleneprogesterone 17-acetate (the compound of Example 41), and 6α-methyl-9α-fluoro-11β,17α-dihydroxy-16-methyleneprogesterone 11,17-diacetate (the compound of Example 45) are each reacted with selenium dioxide to yield respectively 6α,9α,11β-trichloro-16-methylene-17α-hydroxy-1,4-pregnadiene-3,20-dione 17-acetate, 6α-methyl-9α,11β-dichloro - 16-methylene - 17α-hydroxy-1,4-pregnadiene-3,20-dione, 6α-methyl-9α,11β - dichloro-16-methylene-17α-hydroxy - 1,4-pregnadiene-3,20-dione 17-acetate, 16-methylene - 17α-hydroxy-21-fluoro-1,4 - pregnadiene-3,20-dione 17-acetate, 6α-methyl-16-methylene-17α-hydroxy-1,4 - pregnadiene-3,20-dione, 9α,11β - dichloro-21-iodo-16-methylene - 17α-hydroxy-1,4 - pregnadiene-3,20-dione, 9α-bromo-11β-fluoro-16 - methylene-17α-hydroxy-1,4 - pregnadiene - 3,20-dione 17-acetate, 6α-methyl-9α-bromo-11β,17α-dihydroxy - 16-methylene-1,4-pregnadiene-3,20-dione 17-acetate, and 6α-methyl-9α-fluoro-11β,17α-dihydroxy-16-methylene-1,4-pregnadiene-3,20-dione 11,17-diacetate.

Alternatively, the compounds prepared in this example may be obtained by subjecting the corresponding progesterones to the action of a culture of *Corynebacterium simplex* according to the procedure described in Example 4.

Any of the progesterone compounds prepared in the preceding examples may be converted to the corresponding 1-dehydro analogs either chemically with selenium dioxide or microbiologically with *Corynebacterium simplex* as described above.

Example 48.—Preparation of 1,6-bis-dehydroprogesterones

In the manner described in the alternative procedure of Example 5, 6-chloro-16-methylene-17α-hydroxy-4,6-pregnadiene-3,20-dione 17-acetate (prepared as described in Example 46) is reacted with selenium dioxide and mercury in t-butyl alcohol and acetic acid. The resultant product is isolated and purified as described to give 6-chloro-16 - methylene-17α-hydroxy-1,4,6 - pregnatriene-3,20-dione 17-acetate.

In a similar manner, 6-chloro-21-fluoro-16-methylene-17α-hydroxy - 4,6-pregnadiene-3,20-dione 17-acetate, 6-fluoro-16-methylene-17α - hydroxy-4,6-pregnadiene-3,20-dione 17-acetate, 6,21-difluoro-9α,11β-dichloro-16-methylene-17α-hydroxy-4,6-pregnadiene-3,20-dione, 6,9α,11β-trichloro-16-methylene - 17α-hydroxy - 4,6-pregnadiene-3,20-dione 17-acetate, 6,9α,11β-trichloro - 21-fluoro-16-methylene-17α-hydroxy-4,6-pregnadiene-3,20-dione, 6,9α,11β-trichloro - 21-fluoro-16-methylene - 17α-hydroxy-4,6-pregnadiene-3,20-dione 17-acetate, 6-methyl-9α,11β-dichloro-16-methylene-17α-hydroxy - 4,6-pregnadiene-3,20-dione 17-acetate and 6-methyl-9α-fluoro-11β,17α-dihydroxy-16-methylene - 4,6-pregnadiene-3,20-dione 17-acetate (all of which are prepared as described in Example 46) are each reacted with selenium dioxide to give respectively 6-chloro-21-fluoro-16-methylene-17α-hydroxy-1,4,6 - pregnatriene - 3,20-dione 17-acetate, 6-fluoro-16-methylene-17α-hydroxy-1,4,6-pregnatriene-3,20-dione 17-acetate, 6,21-difluoro-9α,11β-dichloro-16-methylene-17α-hydroxy-1,4,6-pregnatriene-3,20-dione, 6,9α,11β-trichloro-16-methylene-17α-hydroxy - 1,4,6-pregnatriene-3,20-dione 17-acetate, 6,9α,11β-trichloro-21-fluoro-16-methylene-17α-hydroxy-1,4,6-pregnatriene-3,20-dione, 6,9α,11β-trichloro-21-fluoro-16-methylene-17α - hydroxy-1,4,6-pregnatriene-3,20-dione 17-acetate, 6-methyl-9α,11β-dichloro-16-methylene-17α-hydroxy - 1,4,6-pregnatriene-3,20-dione 17-acetate and 6-methyl-9α-fluoro-11β,17α-dihydroxy-16-methylene-1,4,6-pregnatriene-3,20-dione 17-acetate.

Example 49.—9α,11β-dihalogeno-21-fluoro-1,4-pregnadiene-3,20-diones

A requisite intermediate, 6α,11β,21-trifluoro-9α-bromo-16-methylene-17α-hydroxyprogesterone, is prepared by reacting 6α,11β-difluoro-9α-bromo - 16-methylene-17α-hydroxyprogesterone (prepared as described in Example 30) with iodine and calcium oxide in the manner of Example 6 to give 6α,11β-difluoro-9α-bromo-21-iodo-16-methylene-17α-hydroxyprogesterone which is then reacted with silver fluoride in the manner of Example 7 to give the desired 21-fluoroprogesterone.

6α,11β,21-trifluoro-9α-bromo - 16 - methylene-17α-hydroxyprogesterone (prepared as described above), 6α,21-difluoro-9α,11β-dichloro-16 - methylene-17α-hydroxyprogesterone (the compound of Example 31B), 6α,9α,11β-trichloro-21-fluoro-16-methylene - 17α-hydroxyprogesterone (the compound of Example 35B), and 6α-methyl-9α,11β-dichloro-21-fluoro-16 - methylene-17α-hydroxyprogesterone (the compound of Example 40B) are each subjected to the action of *Corynebacterium simplex* in the manner of Example 4 to give respectively, 6α,11β,21-trifluoro 9α-bromo-16-methylene - 17α-hydroxy-1,4-pregnadiene - 3,20-dione, 6α,21-difluoro - 9α,11β-dichloro-16-methylene-17α - hydroxy-1,4-pregnadiene-3,20-dione, 6α,9α,11β-trichloro - 21-fluoro-16-methylene - 17α-hydroxy-1,4-pregnadiene-3,20-dione and 6α-methyl-9α,11β-dichloro-21-fluoro-16-methylene-17α-hydroxy-1,4 - pregnadiene-3,20-dione.

Example 50.—16-butylidene-17α-hydroxyprogesterone 17-acetate

A. *16α-n-butyl-5-pregnene-3β-ol-20-one 3-acetate.*—3.6 grams of 5,16-pregnadiene-3β-ol-20-one 3-acetate in 20 ml. of dry toluene is added to a Grignard reagent prepared from 10.5 g. of butyl iodide and 1.8 g. of magnesium in 40 ml. of ether, and containing 200 mg. of cupric chloride. The reaction mixture is distilled until a vapor temperature of 100° C. is reached. The distillation is then stopped, and the reaction temperature maintained at 100° C. for 5 hours. The mixture is cooled, poured into ice and an aqueous solution of ammonium chloride, and the solvent layers separated. The organic layer is distilled in vacuo to a residue which is chromatographed on Florisil. Eluates ranging from 15% ether-in-hexane to 35% ether-in-hexane are collected and evaporated. The resultant residue is dissolved in 20 ml. of dry pyridine and 3 ml. of acetic anhydride and allowed to stand at room temperature for 5 hours. Water is added. A precipitate results which is filtered and crystallized from acetone-hexane to give 16α-n-butyl-5-pregnene-3β-ol-20-one 3-acetate.

B. *16α-n-butyl-17α - bromo-5-pregnene-3β-ol-20-one 3-acetate.*—One gram of the 16α-n-butyl-5-pregnene of Example 50A is dissolved in 10 ml. of acetic acid and there is added 2.1 equivalents of bromine in acetic acid. When the bromine color is discharged, 0.5 g. of sodium iodide in 3 ml. water is added. The solution is warmed at 30° C. for 20 minutes, cooled and then diluted with water. A precipitate results which is filtered, washed with water, dried and crystallized from aqueous acetone to give 16α-n-butyl-17α-bromo-5-pregnene-3β-ol-20-one 3-acetate.

C. *16-n-butyl - 5,16 - pregnadiene-3β-ol-20-one 3 - acetate.*—One gram of the 16α-n-butyl-17α-bromo-5-pregnene of Example 50B is refluxed in 20 ml. of dimethylformamide under a nitrogen atmosphere for 3 hours. The reaction mixture is cooled, then poured into ice-water containing excess hydrochloric acid, and extracted with methylene chloride. The extracts are combined, washed with water, dried over magnesium sulfate and evaporated to a residue which is chromatographed over Florisil. Eluates ranging from 10% ether-in-hexane to 30% ether-in-hexane are combined and evaporated to a residue which is crystallized from methylene chloride-hexane to give 16-n-butyl-5,16-pregnadiene-3β-ol-20-one 3-acetate.

D. *16β-n-butyl - 16α,17α - oxido-5-pregnene-3β-ol-20-one.*—In a manner similar to that described in Example 10D, the 16-n-butyl-5,16-pregnadiene of Example 50C is reacted with hydrogen peroxide in an alkaline solution.

The resultant product is isolated and purified as described to give 16β-n-butyl-16α,17α-oxido-5-pregnene-3β-ol-20-one.

E. *16β-n-butyl-16α,17α-oxidoprogesterone.*—In a manner similar to that described in Example 1B, 16β-n-butyl-16α,17α-oxido-5-pregnene-3β-ol-20-one is reacted with aluminum isopropoxide in the presence of cyclohexanone to give 16β-n-butyl-16α,17α-oxidoprogesterone.

F. *16-butylidene-17α-hydroxyprogesterone.*—In a manner similar to that described in Example 1C, 16β-n-butyl-16α,17α-oxidoprogesterone is reacted with hydrobromic acid in acetic acid to give 16-butylidene-17α-hydroxyprogesterone.

G. *16 - butylidene - 17α - hydroxyprogesterone 17-acetate.*—In the manner of Example 2, the 17α-hydroxyprogesterone of Example 50F is reacted with acetic acid and trifluoroacetic anhydride to give 16-butylidene-17α-hydroxyprogesterone 17-acetate.

*Example 51.—16-ethylidene-17α-hydroxy-4,9(11)-pregnadiene-3,20-dione 17-acetate*

A. *16α-ethyl-5,9(11)-pregnadiene-3β-ol-20-one 3-acetate.*—In a manner similar to that described in Example 50A, 5,9(11),16-pregnatriene-3β-ol-20-one 3-acetate (the compound of Example 20) is reacted with ethyl magnesium iodide and subsequently esterified to give 16α-ethyl-5,9(11)-pregnadiene-3β-ol-20-one 3-acetate.

B. *16α-ethyl - 17α - bromo-5,9(11)-pregnadiene-3β-ol-20-one 3-acetate.*—In the manner of Example 50B, the 16α-ethyl-5,9(11)-pregnadiene of Example 51A is reacted with 3.1 equivalents of bromine in acetic acid and the resultant product treated with 1 g. of sodium iodide and purified to give 16α-ethyl-17α-bromo-5,9(11)-pregnadiene-3β-ol-20-one 3-acetate.

C. *16-ethyl-5,9(11),16-pregnatriene-3β-ol-20-one 3-acetate.*—In the manner of Example 50C, the 16α-ethyl-17α-bromo-5,9(11)-pregnadiene of Example 51B is reacted with dimethylformamide to give 16-ethyl-5,9(11),16-pregnatriene-3β-ol-20-one 3-acetate.

D. *16β-ethyl - 16α,17α - oxido-5,9(11)-pregnadiene-3β-ol-20-one.*—The 16-ethyl-5,9(11),16-pregnatriene of Example 51C is reacted with alkaline hydrogen peroxide in the manner of Example 10D to give 16β-ethyl-16α,17α-oxido-5,9(11)-pregnadiene-3β-ol-20-one.

E. *16β-ethyl - 16α,17α - oxido - 4,9(11) - pregnadiene-3,20-dione.*—In a manner similar to that described in Example 1B, 16β-ethyl-16α,17α-oxido-5,9(11)-pregnadiene-3β-ol-20-one is reacted with aluminum isopropoxide in the presence of cyclohexanone to give 16β-ethyl-16α,17α-oxido-4,9(11)-pregnadiene-3,20-dione.

F. *16-ethylidene - 17α - hydroxy-4,9(11)-pregnadiene-3,20-dione.*—The 16α-17α-oxido-4,9(11)-pregnadiene of Example 51E is reacted with hydrogen bromide in acetic acid in the manner of Example 1C to give 16-ethylidene-17α-hydroxy-4,9(11)-pregnadiene-3,20-dione.

G. *16-ethylidene - 17α - hydroxy - 4,9(11)-pregnadiene-3,20-dione 17-acetate.*—17α - hydroxy - 4,9(11) - pregnadiene of Example 51F is reacted with acetic acid and trifluoroacetic anhydride in the manner of Example 2 to give 16 - ethylidene - 17α - hydroxy-4,9(11)-pregnadiene-3,20-dione 17-acetate.

*Example 52.—9α,11β-dichloro-16-ethylidene-17α-hydroxyprogesterone 17-acetate*

16 - ethylidene-17α-hydroxy-4,9(11)-pregnadiene-3,20-dione 17-acetate is reacted with N-chlorosuccinimide, hydrogen chloride and lithium chloride in the manner described in Example 24A. The resultant product is isolated and purified in the described manner to give 9α,11β-dichloro-16-ethylidene-17α-hydroxyprogesterone 17-acetate.

*Example 53.—9α-iodo-11β-fluoro-16-ethylidene-17α-hydroxyprogesterone 17-acetate*

One gram of 16-ethylidene-17α-hydroxy-4,9(11)-pregnadiene-3,20-dione 17-acetate dissolved in 50 ml. of diethylacetic acid is placed in polyethylene bottle at room temperature and there is added a solution of 2.0 g. of hydrogen fluoride in 15 ml. of chloroform-tetrahydrofuran (1:2) followed by 60 mg. of N-iodosuccinimide. The solution is stirred at room temperature for 17 hours, then is poured into 500 ml. of 10% aqueous sodium bicarbonate solution. The reaction mixture is extracted with methylene chloride and the combined extracts are washed with dilute thiosulfate solution and water, then are dried over magnesium sulfate. The methylene chloride solution is distilled in vacuo to a residue substantially of 9α-iodo-11β-fluoro-16-ethylidene-17α-hydroxyprogesterone 17-acetate.

*Example 54.—9α-chloro-11β,17α-dihydroxy-16-methyleneprogesterone 11-formate 17-acetate*

To a stirred solution of 1 g. of 16-methylene-17α-hydroxy-4,9(11)-pregnadiene-3,20-dione 17-acetate (the compound of Example 23) in 40 ml. of formic acid containing 4 g. of sodium formate, there is added 0.40 g. of N-chlorosuccinimide followed immediately by 2.7 ml. of N-hydrochloric acid. The reaction mixture is stirred for 3 hours at room temperature, then is poured into water. A precipitate results which is filtered, dried and crystallized from acetone-hexane to give 9α-chloro-11β,17α-dihydroxy-16-methyleneprogesterone 11-formate 17-acetate.

*Example 55.—6α-fluoro-9α-iodo-11β,17α-dihydroxy-16-methyleneprogesterone 11,17-diacetate*

To a stirred solution of 5 g. of 6α-fluoro-16-methylene-17α - hydroxy-4,9(11)-pregnadiene-3,20-dione 17-acetate (prepared as described in the alternative procedure of Example 29B) in 200 ml. of glacial acetic acid, is added 20 g. of lithium acetate followed by 3.3 g. of N-iodosuccinimide. The mixture is stirred for 17 hours at room temperature and is then poured into a liter of water. A solid results which is filtered, washed with water, dried and crystallized from ethyl acetate to give 6α-fluoro-9α-iodo-11β,17α-dihydroxy-16-methyleneprogesterone 11,17-diacetate.

*Example 56.—6α-methyl-9α,21-difluoro-11β,17α-dihydroxy-16-methyleneprogesterone*

A. *6α - methyl-9α-fluoro-11β,17α-dihydroxy-16-methyleneprogesterone.*—One gram of 6α-methyl-9α-fluoro-11β,17α-dihydroxy-16-methyleneprogesterone 17-acetate (the compound of Example 42) is dissolved in 50 ml. of methanol and 5 ml. of water containing 0.34 g. of potassium bicarbonate. The solution is refluxed for one-half hour then concentrated to one-half the volume in vacuo. Water is added and a solid precipitates which is filtered and dried to give substantially 6α-methyl-9α-fluoro-11β,17α-dihydroxy-16-methyleneprogesterone.

B. *6α-methyl-9α-fluoro-21-iodo-11β,17α-dihydroxy-16-methyleneprogesterone.*—In the manner described in Example 6, 6α - methyl - 9α - fluoro - 11β,17α-dihydroxy-16-methyleneprogesterone is reacted with iodine and calcium oxide. The resultant product is isolated and purified as described to give 6α-methyl-9α-fluoro-21-iodo-11β,17α-dihydroxy-16-methyleneprogesterone.

C. *6α - methyl - 9α,21 - difluoro - 11β,17α-dihydroxy-16-methyleneprogesterone.*—In the manner of Example 7, the 21-iodoprogesterone of Example 56B is reacted with silver fluoride in moist acetonitrile. The resultant product is isolated and purified as described to give 6α-methyl - 9α,21 - difluoro - 11β,17α-dihydroxy-16-methyleneprogesterone.

*Example 57.—6α,21-difluoro-9α-bromo-11β,17α-dihydroxy-16-methyleneprogesterone*

A. *6α - fluoro - 21-iodo-16-methylene-17α-hydroxy-4,9(11) - pregnadiene-3,20-dione.*—6α-fluoro-16-methylene-17α-hydroxy-4,9(11)-pregnadiene-3,20-dione (the compound of Example 28D) is reacted with iodine and calcium oxide in the manner described in Example 6 to give 6α - fluoro - 21-iodo-16-methylene-17α-hydroxy-4,9(11)-pregnadiene-3,20-dione.

B. *6α,21 - difluoro - 16 - methylene - 17α-hydroxy-4,9 (11) - pregnadiene - 3,20-dione.* — The 21-iodo-4,9(11)-pregnadiene of Example 57A is reacted with silver fluoride in moist acetonitrile in the manner described in Example 7. The resultant product is isolated and purified in the described manner to give 6α,21-difluoro-16-methylene - 17α - hydroxy - 4,9(11) - pregnadiene-3,20-dione.

C. *6α,21 - difluoro - 9α-bromo-11β,17α-dihydroxy-16-methyleneprogesterone.*—In the manner described in Example 41, 6α,21 - difluoro-16-methylene-17α-hydroxy-4,9 (11)-pregnadiene-3,20-dione is reacted with N-bromoacetamide and perchloric acid. The resultant product is isolated and purified as described to give 6α,21-difluoro-9α-bromo-11β,17α-dihydroxy-16-methyleneprogesterone.

*Example 58.—Alternate procedures for the preparation of 16-methylene-17α-acetoxyprogesterone*

A. One gram of 16β-methyl-16α,17α-oxidoprogesterone (the compound of Example 1B) is dissolved in a mixture of 5 ml. of acetic acid, 1.5 ml. of acetic anhydride, and 0.15 g. of p-toluenesulfonic acid. The solution is stirred at room temperature for three hours, then diluted with water. A solid results which is filtered and dried to give 16-methylene-17α-acetoxyprogesterone.

Alternatively, the compound of this example is prepared according to procedures B and C.

B. *3,17α - diacetoxy-16-methylene-3,5-pregnadiene-20-one.*—To one gram of 16β-methyl-16α,17α-oxidoprogesterone (the compound of Example 1B) is added a mixture of 10 ml. of acetic anhydride, 1 ml. of acetic acid and 0.5 g. of p-toluenesulfonic acid. The reaction mixture is stirred at room temperature for 48 hours. Water is added and the resultant mixture is stirred for three hours. The mixture is filtered and the resultant residue is crystallized from ether-hexane to give 3,17α-diacetoxy-16-methylene-3,5-pregnadiene-20-one.

Alternatively, if one gram of 16-methylene-17α-hydroxyprogesterone (the compound of Example 1C) is reacted with acetic anhydride and p-toluenesulfonic acid exactly as described in the procedure of this example there is obtained 3,17α-diacetoxy-16-methylene-3,5-pregnadiene-20-one.

C. *16-methylene-17α-acetoxyprogesterone.*—One gram of 3,17α-diacetoxy - 16-methylene-3,5-pregnadiene-20-one (the compound of Example 58B) is dissolved in 50 ml. of 95% ethanol and there is added 0.5 ml. of concentrated hydrochloric acid. The solution is left at room temperature for 30 minutes, then evaporated under a stream of air to one-third the original volume. Water is added and the resultant solid is filtered and air-dried to give 16-methylene-17α-acetoxyprogesterone.

We claim:

1. A compound selected from the group consisting of 16-alkylideneprogesterones, the 19-nor, 1-dehydro, 6-dehydro, and 1,6-bis-dehydro analogs theseof, said 16-alkylideneprogesterones having the following formula:

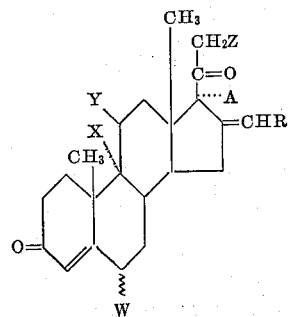

wherein A is a member of the group consisting of hydrogen, hydroxy and acyloxy; R is a member of the group consisting of hydrogen and lower alkyl; Z is a member of the group consisting of hydrogen and halogen; W is a member of the group consisting of H, methyl, and halogen; and when W is hydrogen or methyl, X is halogen and Y is halogen; and when W is halogen, X is a member of the group consisting of hydrogen and halogen, and Y is a member of the group consisting of hydrogen, halogen, keto, hydroxy and lower alkanoyloxy, and when Y is hydrogen, X is hydrogen, and when Y is halogen, X is halogen.

2. A compound according to claim 1 wherein A is lower alkanoyloxy; R, Z, X and Y are hydrogen, and W is halogen, said compound being 6-W-17α-A-16-methyleneprogesterone.

3. A compound according to claim 1 wherein A is lower alkanoyloxy; R, Z and W are hydrogen, and X and Y are halogen, said compound being 9α-X-11β-Y-17α-A-16-methyleneprogesterone.

4. A compound of claim 1 wherein A is lower alkanoyloxy; R and Z are hydrogen, W is methyl, and X and Y are halogen, said compound being 9α-X-11β-Y-17α-A-6-methyl-16-methyleneprogesterone.

5. A compound according to claim 1 wherein A is lower alkanoyloxy; R and Z are hydrogen, and W, X and Y are halogen, said compound being 6-W-9α-X-11β-Y-17α-A-16-methyleneprogesterone.

6. A compound of claim 1 wherein A is lower alkanoyloxy; R and Z are hydrogen, W and X are halogen, and Y is hydroxy, said compound being 6-W-9α-X-11β-Y-17α-16-methyleneprogesterone.

7. A compound according to claim 1 wherein A and Y are lower alkanoyloxy, R and Z are hydrogen, and W and X are halogen, said compound being 6-W-9α-X-11β-Y-17α-A-16-methyleneprogesterone.

8. A compound according to claim 1 wherein R, X, Y and Z are hydrogen; A is acetoxy and W is fluoro, said compound being 6α-fluoro - 16 - methylene-17α-hydroxyprogesterone 17-acetate.

9. A compound according to claim 1 wherein R, X, Y and Z are hydrogen, A is acetoxy and W is chloro, said compound being 6α-chloro-16-methylene - 17α - hydroxyprogesterone 17-acetate.

10. A compound according to claim 1 wherein R, Z and W are hydrogen, A is acetoxy, X and Y are chloro, said compound being 9α,11β-dichloro-16-methylene-17α-hydroxyprogesterone 17-acetate.

11. 9α-X-11β-X-17α-A-21-Z-3-ethoxy-16-methylene-3,5-pregnadiene-20-one wherein X is a member of the group consisting of H and halogen; A is a member of the group consisting of hydroxy and alkanoyloxy; and Z is a member of the group consisting of hydrogen and fluorine.

12. 3-acetoxy-16α,17α-pyrazolino-5,9(11)-pregnadiene-20-one.

13. 16β-methyl-16α,17α-oxido-5,9(11)-pregnadiene-3β-ol-20-one.

14. 16-methylene-5,9(11)-pregnadiene - 3β,17α - diol-20-one.

15. 6α-W-11α,17α-dihydroxy-16-methyleneprogesterone wherein W is halogen.

16. 6α-methyl-9β,11β-oxido-16-methylene-17α-acetoxyprogesterone.

17. A 6-dehydro - 16-alkylideneprogesterone according to claim 1 wherein R, X, Y, and Z are hydrogen, W is chlorine and A is acetoxy, said compound being 6-chloro-16-methylene-17α-hydroxy-4,6-pregnadiene-3,20-dione 17-acetate.

18. 6β-methyl-16-methylene - 20 - ethylene dioxy pregnane-3β,5α,17α-triol.

19. A member selected from the group consisting of 6-halogeno-16-methylene - 17α - hydroxy-9(11)-dehydroprogesterone and 17α-lower alkonoates thereof.

(References on following page)

References Cited by the Examiner

UNITED STATES PATENTS

| | | | |
|---|---|---|---|
| 2,865,808 | 12/1958 | Agnello et al. | 167—65 |
| 2,874,172 | 2/1959 | Herzog et al. | 260—397.45 |
| 2,878,247 | 3/1959 | Miramontes et al. | 260—239.55 |
| 2,894,963 | 7/1959 | Gould et al. | 260—397.45 |
| 2,902,483 | 9/1959 | Agnello et al. | 260—239.55 |
| 2,915,433 | 12/1959 | Agnello et al. | 167—65 |

OTHER REFERENCES

Bower, 81 J.A.C.S. 4107–8 (1959).

Belgian Patent Spec. No. 581,486: Steroids; cited in Derwent.

Belgian Patents Report, volume 60 "A," page A17 (Nov. 30, 1959).

LEWIS GOTTS, *Primary Examiner.*

LESLIE H. GASTON, MORRIS LIEBMAN, *Examiners.*

ELBERT L. ROBERTS, *Assistant Examiner.*

UNITED STATES PATENT OFFICE
CERTIFICATE OF CORRECTION

Patent No. 3,312,692                                                         April 4, 1967

Eugene P. Oliveto et al.

It is hereby certified that error appears in the above numbered patent requiring correction and that the said Letters Patent should read as corrected below.

Column 2, line 63, for "7α-acetoxy" read -- 17α-acetoxy --; column 4, line 36, for "yeld" read -- yield --; column 12, line 17, for "3-ol-" read -- 3β-ol- --; column 13, line 19, for "progesterons" read -- progesterone --; line 25, for "generally" read -- gently --; column 16, line 54, for "by" read -- of --; column 23, line 20, for "produce" read -- product --; column 25, line 7, for "9-bromo" read -- 9α-bromo --; line 53, for "theh" read -- the --; column 26, line 35, after "20-one" insert -- which, --; column 27, line 9, for "6α,9,11β-" read -- 6α,9α,11β- --; line 22, for "silever" read -- silver --; line 35, for "6-methyl-16-methylene-17-hydroxy-", in italics, read -- 6α-methyl-16-methylene-17α-hydroxy- --, in italics; column 28, line 1, for "9-chloro" read -- 9α-chloro --; same line 1, for "11-fluoro" read -- 11β-fluoro --; column 33, line 31, for "3.1" read -- 3:1 --; column 35, line 59, for "theseof" read -- thereof --; column 36, line 31, for "17α-16-methyl" read -- 17α-A-16 methyl --.

Signed and sealed this 21st day of November 1967.

(SEAL)
Attest:

EDWARD M. FLETCHER, JR.                                      EDWARD J. BRENNER
Attesting Officer                                               Commissioner of Patents